United States Patent
Swami et al.

(10) Patent No.: US 11,790,228 B2
(45) Date of Patent: Oct. 17, 2023

(54) METHODS AND SYSTEMS FOR PERFORMING TASKS ON MEDIA USING ATTRIBUTE SPECIFIC JOINT LEARNING

(71) Applicant: SAMSUNG ELECTRONICS CO., LTD., Suwon-si (KR)

(72) Inventors: Kunal Swami, Bengaluru (IN); Prasanna Vishnu Bondada, Bengaluru (IN); Pankaj Kumar Bajpai, Bengaluru (IN); Mahesh P J, Bengaluru (IN); Manoj Kumar, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 324 days.

(21) Appl. No.: 17/154,580

(22) Filed: Jan. 21, 2021

(65) Prior Publication Data

US 2021/0224652 A1  Jul. 22, 2021

(30) Foreign Application Priority Data

Jan. 20, 2020 (IN) .............................. 202041002429
Jan. 18, 2021 (IN) .............................. 202041002429

(51) Int. Cl.
*G06N 3/08* (2023.01)
*G06V 20/40* (2022.01)
(Continued)

(52) U.S. Cl.
CPC ............ *G06N 3/08* (2013.01); *G06F 18/2155* (2023.01); *G06T 7/50* (2017.01); *G06V 10/772* (2022.01);
(Continued)

(58) Field of Classification Search
CPC ...... G06F 18/2155; G06N 3/045; G06N 3/08; G06T 7/50; G06V 10/772; G06V 10/7753; G06V 10/82; G06V 20/41
See application file for complete search history.

(56) References Cited

U.S. PATENT DOCUMENTS 10,474,908 B2    11/2019 Levi et al.
11,562,474 B2 *   1/2023 Holzer .................. G06F 18/251
(Continued)

FOREIGN PATENT DOCUMENTS

CN      109214264 A      1/2019
WO      2018093935 A1    5/2018
(Continued)

OTHER PUBLICATIONS

Amir Atapour-Abarghoue, "Real-Time Monocular Depth Estimation using Synthetic Data with Domain Adaptation via Image Style Transfer," Jun. 2018 , Proceedings of the IEEE Conference on Computer Vision and Pattern Recognition (CVPR), 2018, pp. 2800-2807.*

(Continued)

*Primary Examiner* — Omar S Ismail
(74) *Attorney, Agent, or Firm* — Sughrue Mion, PLLC

(57) ABSTRACT

A learning-based model is trained using a plurality of attributes of media. Depth estimation is performed using the learning-based model. The depth estimation supports performing a computer vision task on the media. Attributes used in the depth estimation include scene understanding, depth correctness, and processing of sharp edges and gaps. The media may be processed to perform media restoration or the media quality enhancement. A computer vision task may include semantic segmentation.

20 Claims, 30 Drawing Sheets

(51) Int. Cl.
*G06F 18/214* (2023.01)
*G06V 10/82* (2022.01)
*G06T 7/50* (2017.01)
*G06V 10/772* (2022.01)
*G06V 10/774* (2022.01)

(52) U.S. Cl.
CPC .......... *G06V 10/7753* (2022.01); *G06V 10/82* (2022.01); *G06V 20/41* (2022.01)

(56) References Cited

U.S. PATENT DOCUMENTS

| | | | |
|---|---|---|---|
| 2015/0125049 A1* | 5/2015 | Taigman | G06T 3/0093 382/118 |
| 2015/0242747 A1* | 8/2015 | Packes | G06N 3/045 706/17 |
| 2016/0034809 A1* | 2/2016 | Trenholm | G06F 18/00 706/20 |
| 2019/0012548 A1 | 1/2019 | Levi et al. | |
| 2019/0035165 A1* | 1/2019 | Gausebeck | G06T 17/00 |
| 2019/0122373 A1 | 4/2019 | Natroshvili et al. | |
| 2019/0244379 A1* | 8/2019 | Venkataraman | G06N 3/08 |
| 2019/0356905 A1 | 11/2019 | Godard et al. | |
| 2020/0082261 A1* | 3/2020 | Silberman | G06N 3/08 |

FOREIGN PATENT DOCUMENTS

| | | | |
|---|---|---|---|
| WO | 2018/184195 A1 | 10/2018 | |
| WO | 2019/099684 A1 | 5/2019 | |
| WO | 2019/155064 A1 | 8/2019 | |

OTHER PUBLICATIONS

Yang Wang, "UnOS: Unified Unsupervised Optical-flow and Stereo-depth Estimation by Watching Videos," Jun. 2019, Proceedings of the IEEE/CVF Conference on Computer Vision and Pattern Recognition (CVPR), 2019 ,pp. 8071-8077.*

Paul Guerrero, "DepthCut: improved depth edge estimation usingmultiple unreliable channels,"May 26, 2017, Computer Vision and Pattern Recognition,pp. 1-10.*

Robert Walecki, "Deep Structured Learning for Facial Action Unit Intensity Estimation," Jul. 2017, Proceedings of the IEEE Conference on Computer Vision and Pattern Recognition (CVPR), 2017, pp. 3405-3412.*

Guerrero, P., et al., "DepthCut: improved depth edge estimation using multiple unreliable channels", The Visual Computer, vol. 34, 2018, pp. 1165-1176.

Cao, Y., et al., "Monocular Depth Estimation with Augmented Ordinal Depth Relationships", arXiv:1806.00585v1 [cs.CV], Jun. 2, 2018, pp. 1-10.

Communication dated Jan. 10, 2022 issued by the Intellectual Property India Patent Office in application No. 202041002429.

Rene Ranftl, et al., "Towards Robust Monocular Depth Estimation: Mixing Datasets for Zero-shot Cross-dataset Transfer", arXivLabs, v2, Dec. 6, 2019, Total 20 pages.

Amir Atapour-Abarghouei and TOBY p. BRECKON, "Real-Time Monocular Depth Estimation using Synthetic Data with Domain Adaptation via Image Style Transfer", 2018 IEEE/CVF Conference on Computer Vision and Pattern Recognition, pp. 2800-2810.

Tali Dekel, "Moving Camera, Moving People: A Deep Learning Approach to Depth Prediction", Google Al Blog, May 23, 2019, URL: https://ai.google.blog.com/2019/05/moving-camera-moving-people-deep.html.

Clement Godard, et al., "Digging Into Self-Supervised Monocular Depth Estimation", arXivLabs, v4, Aug. 17, 2019, Total 18 pages.

Internal Search Report issued May 4, 2021 by the International Searching Authority in International Patent Application No. PCT/KR2021/000793.

Written Opinion issued May 4, 2021 by the International Searching Authority in International Patent Application No. PCT/KR2021/000793.

* cited by examiner

FIG. 1B
 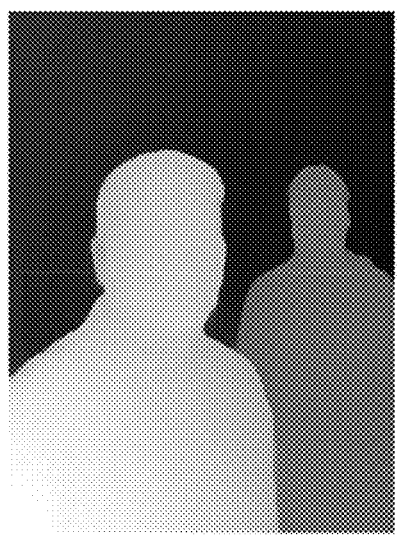
Captured Image　　　Depth map

FIG. 1D
 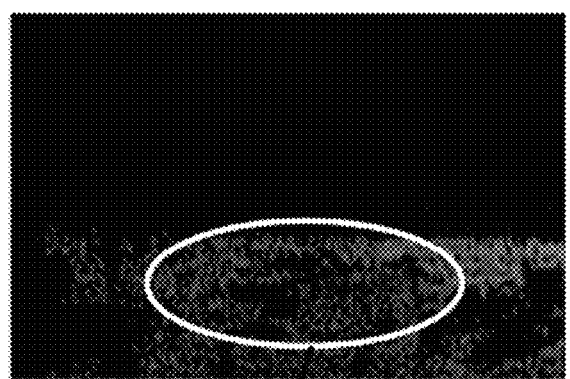
Sparse

FIG. 6A
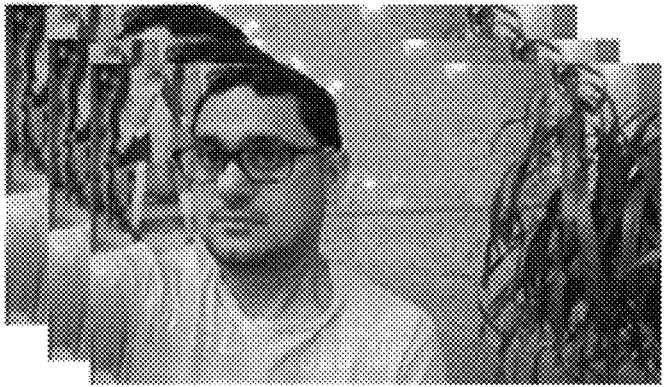
Video frames — Unlabelled media sequence dataset/Dataset 1
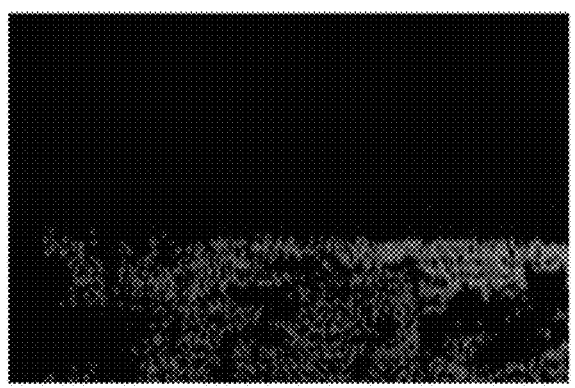
Real-world sparsely labelled dataset/Dataset 2
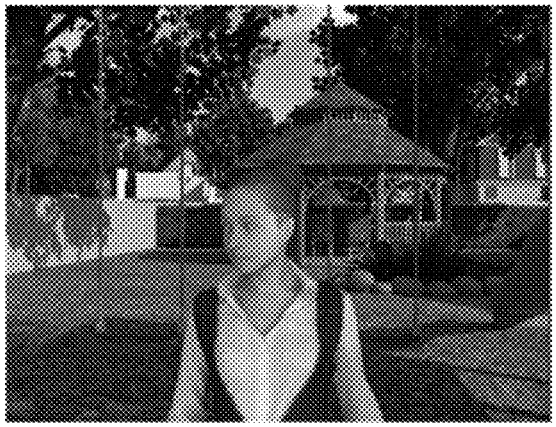
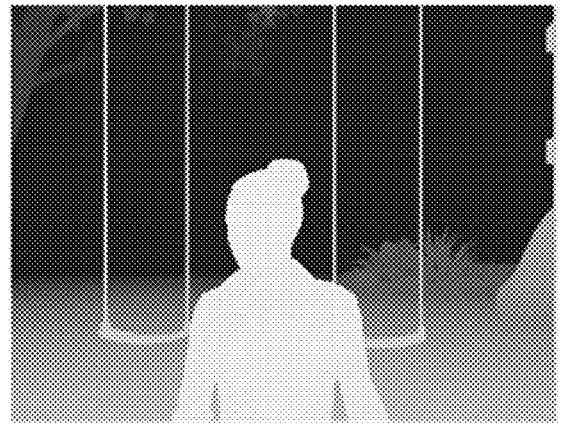
Synthetic dataset/Dataset 3

FIG. 6B
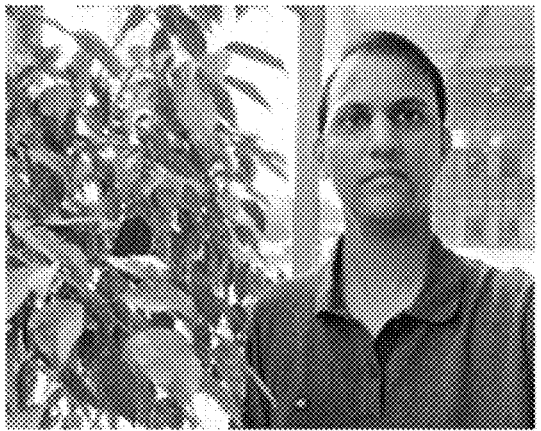 
Dataset -1 –Unlabelled image/media sequence dataset-Scene understanding (Attribute 1)
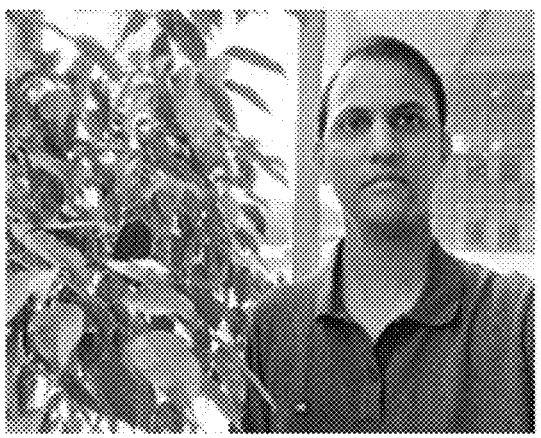 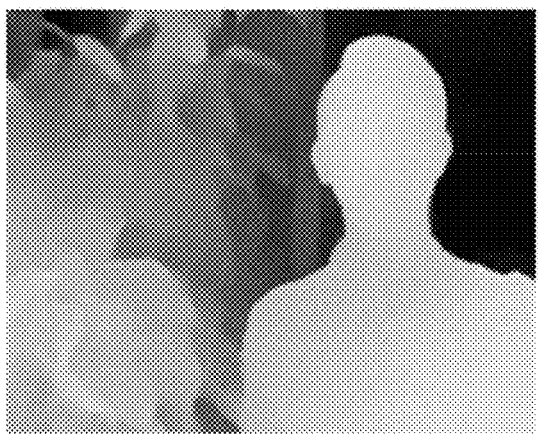
Dataset -2-Real-world sparsely labelled dataset-Correctness (Attribute 2)
 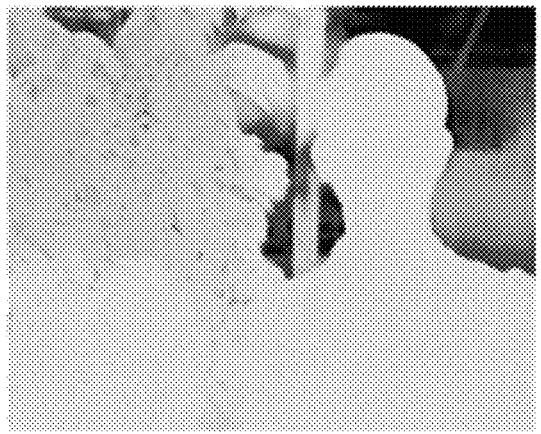
Dataset –Synthetic dataset –Sharp edges and gaps (Attribute 3)

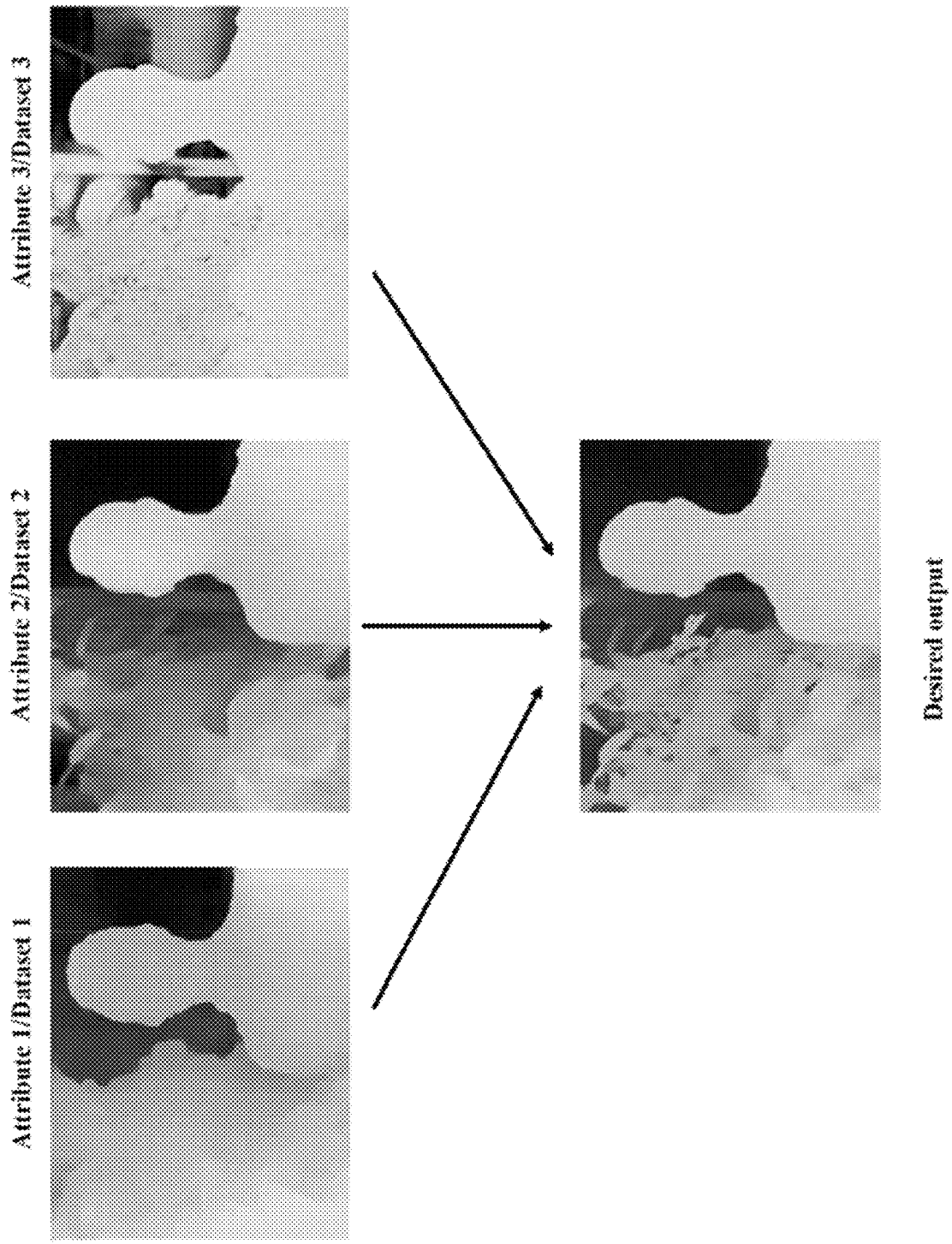

FIG. 6D

| | Attribute | What is needed? |
|---|---|---|
| Dataset 1 | Scene Understanding | Unlabelled video sequences |
| Dataset 2 | Correctness | Real-world images with sparsely labelled depth ground-truth |
| Dataset 3 | Sharpness: Edges and gaps preserved | Synthetic/virtual images with dense depth ground-truth |

Batch ratios = B1 : B2 : B3, where $B1 = (B1+B2+B3) * \frac{L1}{L1+L2+L3}$, $B2 = (B1+B2+B3) * \frac{L2}{L1+L2+L3}$, $B3 = (B1+B2+B3) * \frac{L3}{L1+L2+L3}$

METHODS AND SYSTEMS FOR PERFORMING TASKS ON MEDIA USING ATTRIBUTE SPECIFIC JOINT LEARNING

CROSS REFERENCE TO RELATED APPLICATION

This application claims benefit of priority of Indian Provisional Application No. 202041002429 filed on 20 Jan. 2020, and Indian Complete Application No. 202041002429 filed on 18 Jan. 2021, in the Indian Intellectual Property Office, the contents of the above are hereby incorporated by reference herein.

FIELD

The present disclosure relates to the field of processing media and more particularly to performing at least one processing task on the media using attribute specific joint learning.

BACKGROUND

A neural network may be trained to perform at least one task on media. Examples of the at least one task may be, but is not limited to, depth estimation, processing the media, performing the at least one computer vision task on the media, and so on. In an example herein, processing the media includes image restoration or quality enhancement and the computer vision task includes semantic segmentation. The neural network may include at least one of, a Convolutional Neural Network (CNN), a Deep Neural Network (DNN), and so on.

FIG. 1a depicts an example conventional approach of training a DNN for performing at least one task on media (for example: images). As depicted in FIG. 1a, the example conventional approach involves generating a batch of input images from a collected training dataset and training the DNN to generate an output batch by performing the at least one task. The terms such as, "batch", "mini-batch", and so on, are used interchangeably through the document. The DNN may be trained to generate the output batch, by performing a forward pass of the generated batch of input images through the DNN, computing a loss function between an output batch and ground-truth of the training dataset and performing a standard back propagation, to generate the output batch. However, the ground truth from the training dataset may not include all desired characteristics of an ideal or desired output in the ground truth. Thus, quality of the output batch generated by the DNN may be degraded or not up to the quality as desired, as the quality of the output strictly depends on the quality of the ground truth. For example, in a single image depth estimation (an example task), if the ground truth is sparsely annotated, then the generated output batch may not preserve sharp edges and gaps.

FIG. 1b depicts an example image depth estimation performed on a captured media to generate a depth map. The depth map provides information relating to a distance of surfaces of scene objects from a viewpoint.

In the conventional approach, three different techniques may be used to perform the image depth estimation in the example conventional approach.

A dual camera set up or stereo matching technique may be used for performing the image depth estimation. In accordance with the dual camera technique, dual camera images may be used to compute a disparity map, which may be further converted to depth maps using a camera focal length and a baseline. However, using the dual camera setup for the depth estimation may be expensive. Further, the dual camera setup may not be used for images that have been already captured and stored in a gallery application.

A multi-view stereo matching technique may be used for performing the image depth estimation. The multi-view stereo matching technique may perform the image depth estimation using multiple images captured at different view angles. However, such a process may be complex with poor quality.

A dual-pixel camera sensor based technique may be used for performing the image depth estimation. However, the depth maps generated using the dual-pixel camera sensor based method/technique may be small because of a small pixel subline.

Thus, the dual camera or stereo matching technique, the multi-view stereo matching technique, and the dual-pixel camera sensor based technique used for performing the image depth estimation may be costly and complex, as such techniques require specialized hardware and software calibration set up.

In order to overcome the limitations posed by the dual camera or stereo matching technique, the multi-view stereo matching technique, and the dual-pixel camera sensor based technique, a DNN based single image depth estimation may be used to generate the depth maps. However, the DNN based single image depth estimation may be an extremely challenging, as collecting real world training dataset for the depth estimation using the single RGB image may be a challenging task. The real world training dataset may be collected using any one of the methods such as, but are not limited to, a structured light and time-of-flight setup (as depicted in FIG. 1c). However, using such methods, the real world training dataset may not be collected in all environments such as, but are not limited to, outdoors, an environment with reflective surfaces, and so on. Also, the depth maps generated using such a process may be sparse, where amount of sparsity varies with an environment and accuracy of the depth maps depends on a type of sensor and environment.

Further, the DNN based single image depth estimation may have the following drawbacks:
  absence of required annotated dataset;
  laborious/impractical data annotation effort (as depicted in FIGS. 1d and 1e);
  absence of depth related cue(s) except scene geometry, which may be often confusing;
  confusing or tricky background;
  generation of highly textured objects;
  ambiguous mixing of foreground and background regions;
  preserving of sharp details of the images;
  generation of plane texture objects; and
  presence of plane texture objects and saturated regions in the images.

SUMMARY

The principal object of the embodiments herein is to disclose methods and systems for performing at least one task on media using a learning-based model that is trained using a plurality of attributes of the media, wherein the at least one task includes at least one of, depth estimation, processing the media (media restoration or media quality enhancement), and performing at least one computer vision task (semantic segmentation) on the media.

Accordingly, the embodiments herein provide methods and systems for training a learning-based model to perform at least one task on media.

Provided herein is an electronic device including: a memory; and a processor coupled to the memory and configured to: group a plurality of training datasets into a plurality of groups of training datasets based on a plurality of attributes, obtain a plurality of output batches for the plurality of groups of training datasets by sampling each group of training datasets based on a batch proportion of the plurality of groups of training datasets, obtain a plurality of loss values of the plurality of groups of training datasets respectively, and train a learning-based model based on the plurality of loss values.

Also provided herein is a control method of an electronic device including: grouping a plurality of training datasets into a plurality of groups of training datasets based on a plurality of attributes; obtaining a plurality of output batches for the plurality of groups of training datasets by sampling each group of the plurality of groups of training datasets based on a batch proportion of the plurality of groups of training datasets; obtaining a plurality of loss values of the plurality of groups of training datasets respectively; and training a learning-based model based on the plurality of loss values.

Also provided herein is a non-transitory computer-readable medium storing instructions, wherein the instructions are configured to cause a processor to: group a plurality of training datasets into a plurality of groups of training datasets based on a plurality of attributes; obtain a plurality of output batches for the plurality of groups of training datasets by sampling each group of the plurality of groups of training datasets based on a batch proportion of the plurality of groups of training datasets; obtain a plurality of loss values of the plurality of groups of training datasets respectively; and train a learning-based model based on the plurality of loss values.

The plurality of attributes may comprise at least one of scene understanding, depth correctness or sharp edges and gaps, and wherein the training comprises training the learning-based model based on the plurality of loss values to perform a depth estimation.

The plurality of groups may comprise at least one of: an unlabelled media sequence dataset corresponding to an attribute of the scene understanding, a real-world sparsely labelled dataset corresponding to the attribute of the depth correctness, or a synthetic media with depth ground-truth dataset corresponding to the attribute of the sharp edges and gaps.

The obtaining the plurality of loss values may comprise obtaining the plurality of loss values of the plurality of groups respectively by: defining a view construction loss for each group of training datasets corresponding to the attribute of the scene understanding, defining a pixelwise $L_1/L_2$ loss for each group of training datasets corresponding to the attribute of the depth correctness and defining a gradient difference loss for each group of training datasets corresponding to the attribute of the sharp edges and gaps.

The control method may further comprise receiving an image, obtaining the depth estimation by inputting an image to the trained learning-based model, and performing at least one of applying bokeh effect, applying augmented reality (AR) effect, AR measurement, refocusing or applying dolly effect to the image based on the depth estimation.

The control method may further comprise: adjusting the batch proportion of the plurality of groups based on the plurality of loss values, and reobtaining a plurality of output batches for the plurality of groups of training datasets by sampling each group of training datasets based on the adjusted batch proportion of the plurality of groups or relative importance of the plurality of groups, reobtaining a plurality of loss values of the plurality of groups respectively, and retraining the learning-based model based on the plurality of reobtained loss values.

The reobtaining the plurality of output batches may comprise reobtaining the plurality of output batches using the adjusted batch proportion of the plurality of groups or the relative importance of the plurality of groups based on a training loss curve obtained for the plurality of loss values.

The control method may further comprise tagging each group of training datasets as one of a primary dataset and a secondary dataset.

The control method may further comprise aligning data distribution of each output batch of each group of training datasets corresponding to the secondary dataset to data distribution of the output batch of a group of training datasets corresponding to the primary dataset.

The control method may further comprise: obtaining a combined loss value by weighting the plurality of loss values based on loss factors dynamically obtained based on the generated plurality of output batches or relative importance of the plurality of groups, and wherein the training comprises training the learning-based model based on the combined loss value.

Accordingly, the embodiments herein provide an electronic device comprising a memory and a processor coupled to the memory. The processor is configured to construct a desired output for a learning-based model. The processor is further configured to identify a plurality of attributes from the constructed desired output. The processor is further configured to classify a plurality of training datasets into at least one group of training datasets, wherein each group of training datasets corresponds to at least one of the identified plurality of desired attributes. The processor is further configured to generate an output batch of a plurality of output batches for each group of training datasets by sampling each group of training datasets based on a batch proportion logic. The processor is further configured to compute attribute specific loss value for the output batch of each group of training datasets. The processor is further configured to train the learning-based model based on a combination of the attribute specific loss values of the output batch of each group of training datasets to perform the at least one task on the media.

According to one aspect of the present disclosure, there is provided an electronic device comprising: a memory; and a processor coupled to the memory and configured to: group a plurality of training datasets into a plurality of groups of training datasets based on a plurality of attributes, obtain a plurality of output batches for the plurality of groups of training datasets by sampling each group of training datasets based on a batch proportion of the plurality of groups, obtain a plurality of loss values of the plurality of groups respectively, and train a learning-based model based on the plurality of loss values.

The plurality of attributes may comprise at least one of scene understanding, depth correctness or sharp edges and gaps, and wherein the processor is further configured to train the learning-based model based on the plurality of loss values to perform a depth estimation.

The plurality of groups may comprise at least one of: an unlabelled media sequence dataset corresponding to an attribute of the scene understanding, a real-world sparsely labelled dataset corresponding to the attribute of the depth correctness, or a synthetic media with depth ground-truth dataset corresponding to the attribute of the sharp edges and gaps.

The processor may be further configured to: obtain the plurality of loss values of the plurality of groups respectively by: defining a view construction loss for each group of training datasets corresponding to the attribute of the scene understanding, defining a pixelwise $L_1/L_2$ loss for each group of training datasets corresponding to the attribute of the depth correctness and defining a gradient difference loss for each group of training datasets corresponding to the attribute of the sharp edges and gaps.

The processor may be further configured to: receive an image, obtain the depth estimation by inputting an image to the trained learning-based model, and perform at least one of applying bokeh effect, applying augmented reality (AR) effect, AR measurement, refocusing or applying dolly effect to the image based on the depth estimation.

The processor may be further configured to: adjust the batch proportion of the plurality of groups based on the plurality of loss values, and reobtain a plurality of output batches for the plurality of groups of training datasets by sampling each group of training datasets based on the adjusted batch proportion of the plurality of groups or relative importance of the plurality of groups, reobtain a plurality of loss values of the plurality of groups respectively, and retrain the learning-based model based on the plurality of reobtained loss values.

The processor may be further configured to reobtain the plurality of output batches using the adjusted batch proportion of the plurality of groups or the relative importance of the plurality of groups based on a training loss curve obtained for the plurality of loss values.

The processor may be further configured to tag each group of training datasets as one of a primary dataset and a secondary dataset.

The processor may be further configured to align data distribution of each output batch of each group of training datasets corresponding to the secondary dataset to data distribution of the output batch of a group of training datasets corresponding to the primary dataset.

The processor may be further configured to: obtain a combined loss value by weighting the plurality of loss values based on loss factors dynamically obtained based on the generated plurality of output batches or relative importance of the plurality of groups, and train the learning-based model based on the combined loss value.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIG. 1b depicts an example image depth estimation;

FIGS. 1c, 1d and 1e depict an example DNN based single image depth estimation;

FIGS. 6a-6d depict a plurality of attributes and groups of training datasets, according to exemplary embodiments as disclosed herein;

DETAILED DESCRIPTION

Figure 1A:
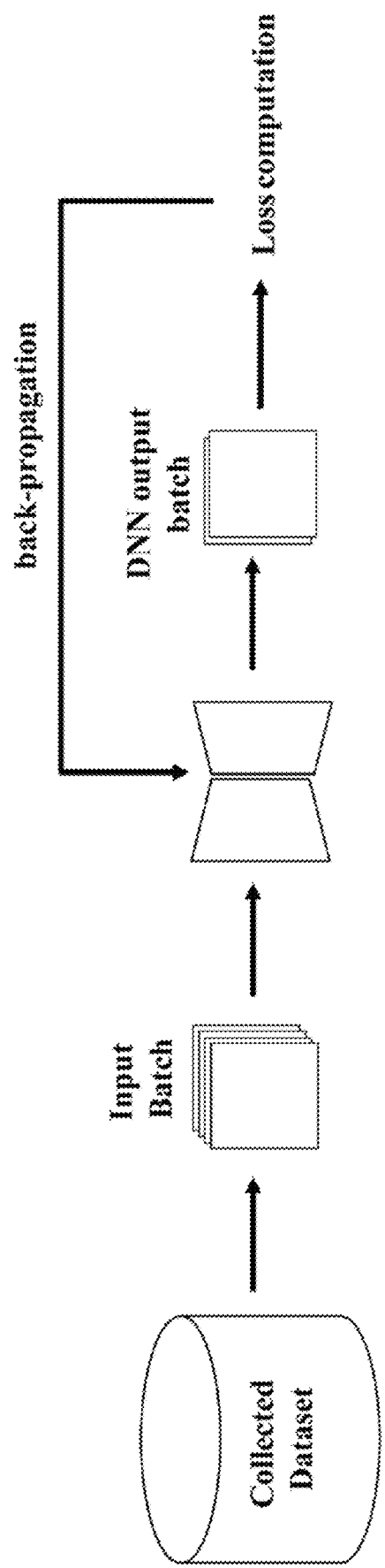
FIG. 1a depicts an example conventional approach of training a Deep Neural Network (DNN) for performing at least one task on media.
Figure 1C:
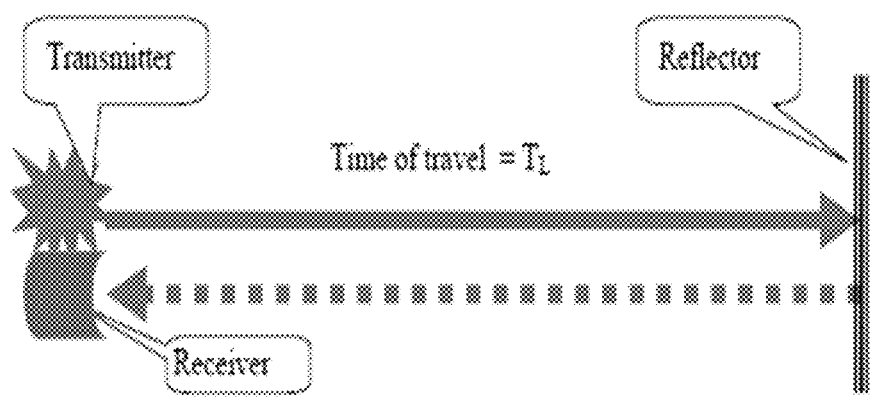
Figure 1E:
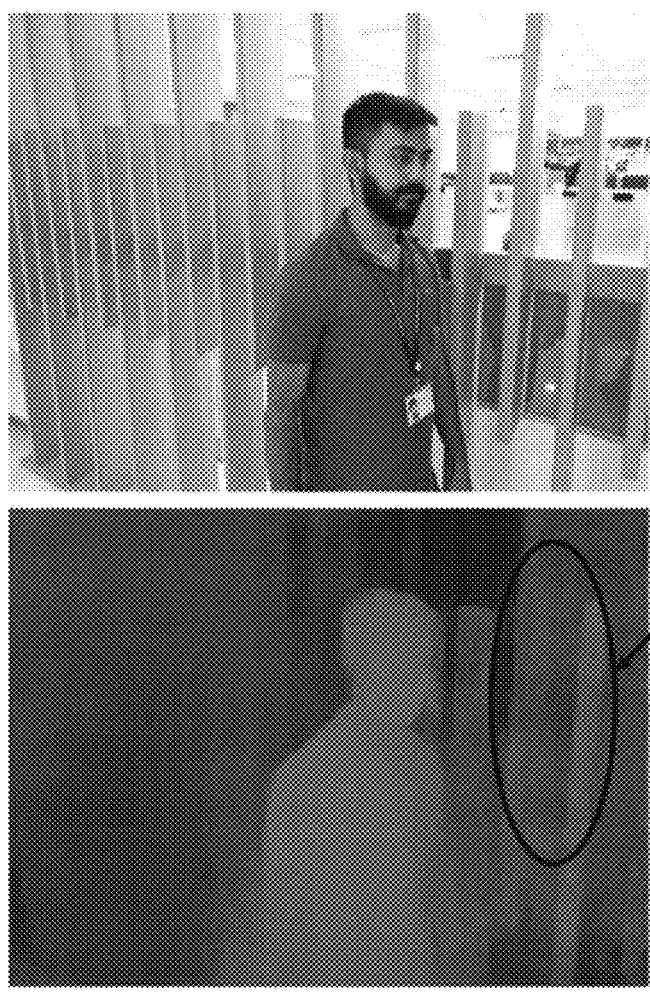

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for training a learning-based model to perform at least one task on media. The at least one task includes at least one of, depth estimation, processing the media, and performing at least one computer vision task on the media. Processing the media includes at least one of, media restoration, media quality enhancement, or the like. The at least one computer vision task includes a semantic segmentation. The learning-based model is trained using a plurality of attributes of the media. The plurality of attributes of the media includes at least one of, scene understanding, depth correctness, sharp edges, and gaps, if the at least one task to be performed on the media includes the depth estimation. Referring now to the drawings, and more particularly to FIGS. 2 through 11, where similar reference characters denote corresponding features consistently throughout the figures, there are shown example embodiments.

Figure 2A:
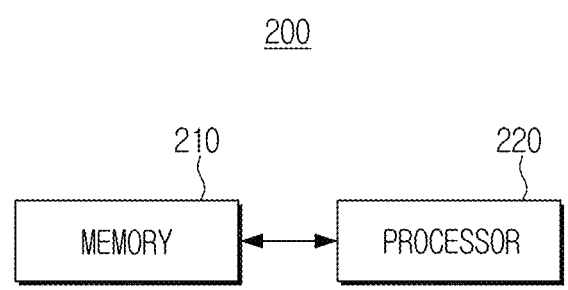
FIGS. 2a and 2b are example diagrams depicting components of an electronic device for training a learning-based model to perform one or more tasks on media, according to exemplary embodiments as disclosed herein.

FIG. 2a is an example diagram depicting components of an electronic device 200 for training a learning-based model, according to embodiments as disclosed herein.

According to FIG. 2a, in some embodiments, the electronic device 200 includes a memory 210 and a processor 202.

The memory 210 may be implemented as an internal memory such as a read-only memory (ROM) (for example, electrically erasable programmable read-only memory (EEPROM)) and a random-access memory (RAM) or a memory separate from the processor 202. In this case, the memory 210 may be implemented as at least one of a memory embedded within the electronic device 200 or a memory detachable from the electronic device 200 according to the usage of data storage. For example, the data for driving the electronic device 200 may be stored in the memory embedded within the electronic device 200, and the data for upscaling of the electronic device 200 may be stored in the memory detachable from the electronic device 200.

A memory embedded in the electronic device 200 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

At least one instruction for controlling the electronic device 200 may be stored in the memory 210. A learning-based model may be stored in the memory 210.

The processor 202 may control the electronic device 200 in overall.

The processor 202 may be implemented with at least one of a digital signal processor (DSP), a microprocessor, and a time controller (TCON), a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 202 may be implemented in a system on chip (SoC) type or a large scale integration (LSI) type in which a processing algorithm is built therein or in a field programmable gate array (FPGA) type. The processor 202 may perform various functions by executing computer executable instructions stored in the memory.

The processor 202 may control overall operations of the electronic device 200 using various programs stored in the memory 210.

To be specific, the processor 202 includes at least one of a random access memory (RAM), a read-only memory (ROM), a main central processing unit (CPU), a first to nth interfaces, and a bus. The RAM, the ROM, the main CPU, the first to nth interfaces, or the like, may be interconnected through the bus. The ROM stores one or more instructions for booting the system and the like. When the turn-on instruction is input and power is supplied, the CPU copies the OS stored in the memory 210 to the RAM according to the stored one or more instructions in the ROM, and executes the OS to boot the system. When the booting is completed, the CPU copies various application programs stored in the memory 210 to the RAM, executes the application program copied to the RAM, and performs various operations. The main CPU accesses the memory 210 and performs booting using an operating system (OS) stored in the memory 210, and performs various operations using various programs, contents data, or the like, stored in the memory 210. The first to nth interface are connected to the various elements described above. One of the interfaces may be a network interface connected to an external device through the network.

The processor 202 coupled to the memory 210 and configured to group a plurality of training datasets into a plurality of groups of training datasets based on a plurality of attributes, obtain a plurality of output batches for the plurality of groups of training datasets by sampling each group of training datasets based on a batch proportion of the plurality of groups, obtain a plurality of loss values of the plurality of groups respectively, and train a learning-based model based on the plurality of loss values.

The plurality of attributes may comprise at least one of scene understanding, depth correctness or sharp edges and gaps, and wherein the processor 202 is further configured to train the learning-based model based on the plurality of loss values to perform a depth estimation.

The plurality of groups may comprise at least one of: an unlabelled media sequence dataset corresponding to an attribute of the scene understanding, a real-world sparsely labelled dataset corresponding to the attribute of the depth correctness, or a synthetic media with depth ground-truth dataset corresponding to the attribute of the sharp edges and gaps.

The processor 202 may be further configured to: obtain the plurality of loss values of the plurality of groups respectively by: defining a view construction loss for each group of training datasets corresponding to the attribute of the scene understanding, defining a pixelwise L1/L2 loss for each group of training datasets corresponding to the attribute of the depth correctness and defining a gradient difference loss for each group of training datasets corresponding to the attribute of the sharp edges and gaps.

The processor 202 may be further configured to: receive an image, obtain the depth estimation by inputting an image to the trained learning-based model, and perform at least one of applying bokeh effect, applying augmented reality (AR) effect, AR measurement, refocusing or applying dolly effect to the image based on the depth estimation. The dolly effect is an effect according to dolly zoom which is an in-camera effect that appears to undermine normal visual perception. The dolly effect is achieved by zooming a zoom lens to adjust the field of view while the camera moves toward or away from the subject in such a way as to keep the subject the same size in the frame throughout.

The processor 202 may be further configured to: adjust the batch proportion of the plurality of groups based on the plurality of loss values, and reobtain a plurality of output batches for the plurality of groups of training datasets by sampling each group of training datasets based on the adjusted batch proportion of the plurality of groups or relative importance of the plurality of groups, reobtain a plurality of loss values of the plurality of groups respectively, and retrain the learning-based model based on the plurality of reobtained loss values.

The processor 202 may be further configured to reobtain the plurality of output batches using the adjusted batch proportion of the plurality of groups or the relative importance of the plurality of groups based on a training loss curve obtained for the plurality of loss values.

The processor 202 may be further configured to tag each group of training datasets as one of a primary dataset and a secondary dataset.

The processor 202 may be further configured to align data distribution of each output batch of each group of training datasets corresponding to the secondary dataset to data distribution of the output batch of a group of training datasets corresponding to the primary dataset.

The processor 202 may be further configured to: obtain a combined loss value by weighting the plurality of loss values based on loss factors dynamically obtained based on the generated plurality of output batches or relative importance of the plurality of groups, and train the learning-based model based on the combined loss value.

Figure 2B:
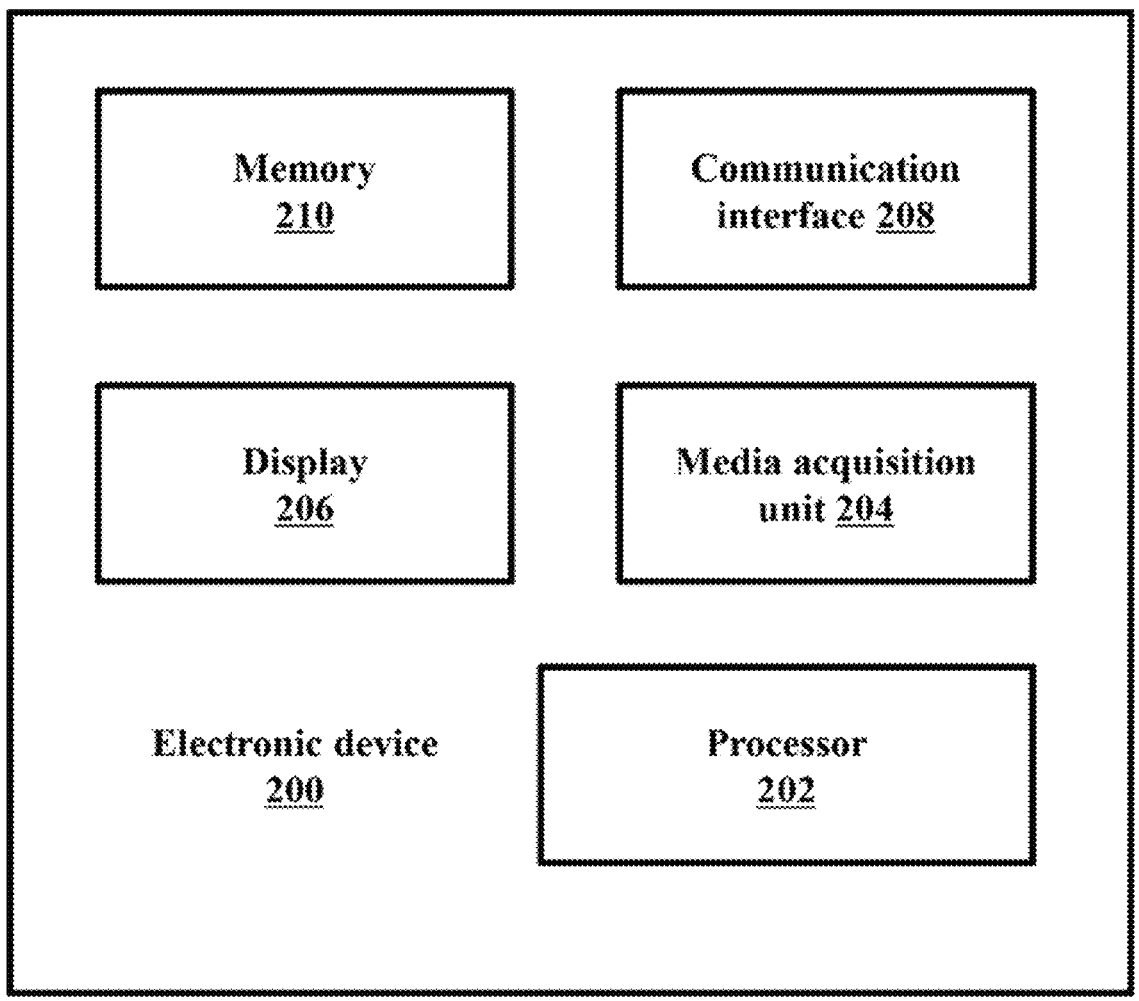

FIG. 2b is an example diagram depicting components of an electronic device 200 for training a learning-based model to perform one or more tasks on media, according to embodiments as disclosed herein. The electronic device 200 referred herein may be any device that may be capable of capturing and/or storing the media. Examples of the electronic device 200 may be, but are not limited to, a mobile phone, a smart phone, a tablet, a handheld device, a phablet, a laptop, a computer, a wearable computing device, a medical equipment, a camera, a gaming device, an Augmented Reality (AR) device, an Internet of Thing (IoT) device, and so on. The electronic device 200 may also be a special-purpose computing system such as, but are not limited to, a server, a cloud, a multiprocessor system, a microprocessor based programmable consumer electronic device, a network computer, a minicomputer, a mainframe computer, and so on.

Figure 3:
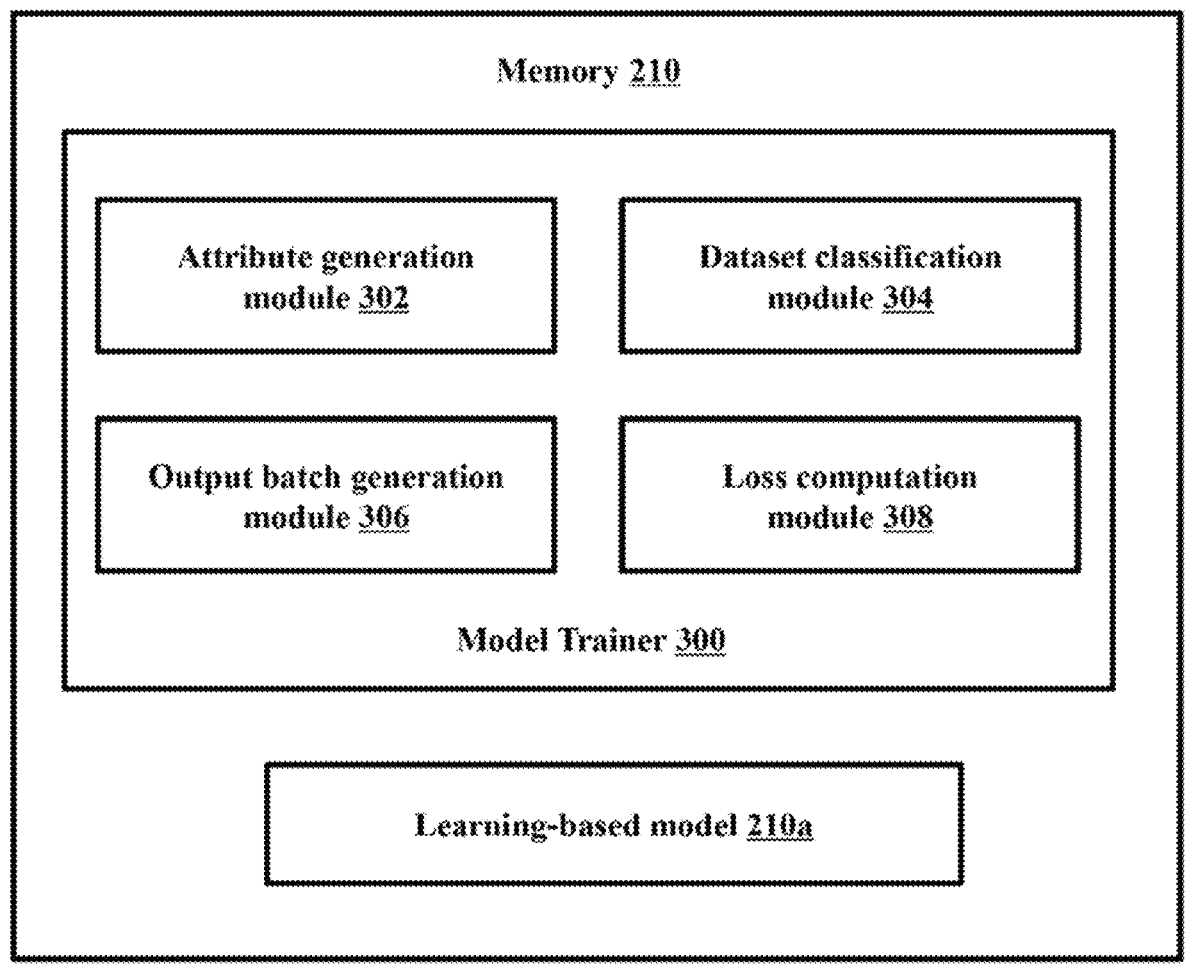
FIG. 3 depicts a model trainer performable on the electronic device for training the learning-based model to perform the one or more tasks on the media, according to exemplary embodiments as disclosed herein.

The electronic device 200 may be configured to train the learning-based model 210a (as depicted in FIG. 3) to perform one or more tasks on the media.

A learning-based model may include parameters or coefficients that have been trained to recognize certain types of patterns. The model may be trained over a set of data. The training may be done with an algorithm which permits the model to learn from the data.

Examples of the tasks may be, but are not limited to, depth estimation of the media, processing the media, performing one or more Computer Vision (CV) tasks on the media, and so on. In an example, processing the media includes at least one of, but is not limited to, media restoration, media quality enhancement, applying Bokeh effect, applying Augmented Reality (AR) effect, AR measurement, refocusing, applying dolly effect and so on. In an example, the CV task may include at least one of, but is not limited to, semantic segmentation, or the like.

Examples of the media may be, but are not limited to, images, videos, Graphics Interchange Formats (GIFs), raw camera data, and so on. In an example, the raw camera data includes bayer data, or the like.

Examples of the learning-based model 210a may be, but are not limited to, a machine learning network, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, and so on. The learning-based model 210a includes a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers of the learning-based model 210a may vary based on the type of the learning-based model 210a. In an example, the learning-based model 210a may include an input layer, an output layer, and a hidden layer. The input layer receives an input (for example: the media) and forwards the received input to the hidden layer. The hidden layer transforms the input received from the input layer into a representation, which may be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The learning-based model 210a may be trained using one or more learning methods such as, but are not limited to, supervised learning, unsupervised learning, semi-supervised learning, reinforcement learning, regression-based learning, and so on.

In some embodiments, see FIG. 2b, the electronic device 200 includes a processor 202, a media acquisition unit 204, a display 206, a communication interface 208, and a memory 210. The electronic device 200 may also connect with at least one external entity (for example; such as, but are not limited to, a server, a database, and so on) using a communication network for accessing training datasets, the media (on which the one or more tasks to be performed), and so on. The training datasets may include the media annotated/labelled with content and/or features of one or more objects interested in the media, unannotated/unlabelled dataset, or the like. Examples of the communication network may be, but are not limited to, a wired network, a value added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy (BLE), Zigbee, Wi-Fi Direct (WFD), Ultra-wideband (UWB), infrared data association (IrDA), near field communication (NFC), and so on.

The processor 202 may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU). The one or the plurality of processors may also be multiple homogenous cores, multiple heterogeneous cores, multiple Central Processing Units (CPUs) of different kinds, accelerators, and so on.

The processor 202 may be configured to train the learning-based model 210a for performing the one or more tasks on the media. For training the learning-based model 210a, the processor 202 constructs a desired output for the learning-based model 210a. In an example, the processor 202 constructs the desired output for the learning-based model 210a, based on the one or more tasks to be performed by the learning-based model 210a. In an example, the processor 202 may construct a depth map as the desired output (for example: as depicted in FIG. 6c), if an example task of depth estimation has to be performed on the media.

In another example, the processor 202 constructs the desired output for the learning-based model 210a based on a first feedback received from a user. The first feedback includes results of qualitative, quantitative, and subjective analysis performed on the media.

The processor 202 identifies a plurality of attributes from the constructed desired output. In an example, the processor 202 identifies the plurality of attributes from the constructed desired output based on knowledge of one or more problems that have to be solved in the output to be generated for the media. In another example, the processor 202 identifies the plurality of attributes from the constructed desired output based on a second feedback received from the user. The second feedback includes results of the subjective analysis performed on the media.

In an example, the plurality of attributes includes at least one of, but is not limited to, scene understanding, depth correctness, sharp edges, and gaps, or the like, if the task to be performed on the media includes the depth estimation. In another example, the plurality of attributes includes at least one of, but is not limited to, high dynamic range, bokeh intensity, noise level, or the like, if the task to be performed on the media includes the media quality enhancement. It is understood that any other similar attributes may be identified from the desired output, depending on the one or more tasks to be performed on the media.

On identifying the plurality of attributes from the constructed desired output, the processor 202 collects and classifies the collected plurality of training datasets into one or more groups of training datasets. The group of training datasets may include at least one of, but is not limited to, an unlabeled media sequence dataset, a real-world sparsely labelled dataset, a synthetic/virtual media dataset, and so on.

In an embodiment, the processor 202 may collect the training datasets by capturing the media using the media acquisition unit 204 and applying at least one of, computer vision stereo matching methods, computer graphics methods, and so on, on the captured media. In an example, the processor 202 captures the media/video using the media acquisition unit 204 (for example: a camera) and extracts individual image frames from the captured media, wherein the extracted individual image frames constitute the unlabelled media sequence dataset.

In an example, the processor 202 captures the media using the media acquisition unit 204 (for example: dual cameras) and processes the media by applying a computer vision stereo matching method on the captured media, wherein the processed media constitute the real-world sparsely labelled dataset. In another example, the processor 202 may acquire the media that constitute the real-world sparsely labelled dataset using time-of-flight and structured light sensor structures. The real-world sparsely labelled dataset may include sparsely labelled ground truth. In an example herein, the ground truth corresponds to a true depth map or true depth values obtained for training the learning-based model 210a in a supervised manner.

In an example, the processor 202 creates the media using a computer graphic method, wherein the created media constitute the synthetic dataset. The computer graphic method may be intuitively inferred by one of ordinary skill in the art and thus, its detailed description is omitted. The synthetic dataset may include high quality, pixel perfect and dense ground-truth. In another embodiment, the processor 202 may collect the training datasets by accessing the memory 204. In another embodiment, the processor 202 may collect the training datasets by accessing the at least one external entity.

Each group of training datasets carries or contributes or corresponds to the plurality of desired attributes identified from the constructed desired output. In an example, the processor 202 may group the training datasets into a dataset 1/unlabelled media sequence dataset, a dataset 2/real-world sparsely labelled dataset, and a dataset 3/synthetic dataset. The dataset 1/unlabelled media sequence dataset corresponds to the scene understanding (an example of the plurality of attributes). Using the unlabelled media sequence dataset as the training dataset to train the learning-based model 210a may enable the learning-based model 210a to determine a reason about semantic relationships between objects present in the media. The dataset 2/real-world sparsely labelled dataset corresponds to the depth correctness (an example of the plurality of attributes). Using the real-world sparsely labelled dataset as the training dataset to train the learning-based model 210a may enable the learning-based model 210a to determine structures of the objects in the media. The dataset 3/synthetic media dataset corresponds to the sharp edges and gaps (an example of the plurality of attributes). Using the synthetic media dataset as the training dataset to train the learning-based model 210a may enable the learning-based model 210a to determine the sharp edges and gaps between the objects in the media and generate an output with smooth variations. Embodiments hereinafter use the terms "training datasets", "attributes" interchangeably through the document. The groups of training datasets are explained in detail in conjunction with FIGS. 6a and 6d.

The scene understanding is identification of semantic relationships between objects present in the media, the depth correctness means an accuracy of the depth, the sharp edges and gaps mean that the edges and gaps are distinguished from adjacent object.

In an embodiment, the processor 202 may train the learning-based model 210a on all the groups of training datasets simultaneously. The processor 202 may train the learning-based model 210a on each of groups of training datasets using at least one of, supervised learning, unsupervised learning, and so on. In an example, the processor 202 may train the learning-based model 210a on the unlabelled media sequence dataset using the unsupervised learning. In an example, the processor 202 may train the learning-based model 210a on the real-world sparsely labelled dataset and the synthetic dataset using the supervised learning.

On classifying the training datasets into the groups of training datasets, the processor 202 tags each group of training datasets as a primary dataset or a secondary dataset. The processor 202 tags each group of training datasets as the primary dataset or the secondary dataset, based on ranking or importance of the corresponding attributes in training the learning-based model 210a to perform the one or more tasks on the media. In an embodiment, the processor 202 may pre-define the ranking or importance of each attribute based on the one or more tasks to be performed on the media. In another embodiment, the processor 202 may define/assign the ranking or importance for each attribute, based on relative size of the corresponding group of training datasets. For example, smaller the size of the group of training dataset, compared to the other groups of training datasets, more importance or weightage may be assigned for the corresponding attribute compared to other attributes. In another embodiment, the processor 202 may allow the user to assign the ranking to each attribute based on a subjective assessment performed on the attributes.

In an example, consider that the processor 202 trains the learning-based model 210a to perform an example task of depth estimation on the media. In such a case, the processor 202 may tag the real-world sparsely labelled dataset corresponding to the depth correctness as the primary dataset, as the depth correctness may be an important attribute (or an attribute with the highest ranking compared to the unlabelled media sequence dataset and the synthetic dataset), in training the learning-based model 210a to perform the depth estimation of the media. The processor 202 may tag the real-world sparsely labelled dataset and the synthetic dataset as the secondary dataset.

On tagging each group of training datasets, the processor 202 generates an output batch for each group of training datasets.

For generating the output batch for each group of training datasets, the processor 202 samples one or more input batches from each group of training datasets. Each input batch may include the training dataset of the same group.

On sampling the one or more input batches, the processor 202 adjusts relative proportion/size of the one or more input batches with respect to each other using a batch proportion logic.

The processor 202 may adjust the proportion/sizes of the one or more input batches corresponding to the one or more groups of training datasets, based on the plurality of attributes identified from the desired output of the learning-based model 210a and/or attribute specific loss values. Herein, the attribute specific loss values may be the attribute specific loss values computed for previous one or more output batches of the learning-based model 210a corresponding to the one or more groups of training datasets. The attribute specific loss value may indicate a prediction error of the learning-based model 210a in performing the one or more tasks on the media in terms of the identified specific qualitative or quantitative attributes.

In an embodiment, the processor 202 may adjust the proportion of the one or more input batches using a fixed batch proportion logic, at an initial stage of training the learning-based model 210a. In accordance with the fixed batch proportion logic, the processor 202 may adjust the one or more input batches based on a pre-defined proportion of the input batches. The processor 202 may pre-define the proportion of the input batches based on the relative importance of the plurality of attributes.

In another embodiment, the processor 202 may adjust the proportion of the one or more input batches using a dynamic batch proportion logic, on training the learning-based model 210a for a number of iterations. In accordance with the dynamic batch proportion logic, the processor 202 may use the relative importance of the plurality of attributes and the attribute specific loss values corresponding to the one or more groups of training datasets.

The processor 202 may determine to use the fixed batch proportion logic or the dynamic batch proportion logic for adjusting the proportion of the respective one or more input batches, based on a training loss curve generated for the attribute specific loss values. The processor 202 may collect the attribute specific loss values computed for the output batches corresponding to the one or more group of training datasets/attributes, of each iteration. The processor 202 generates the training loss curve for each iteration of training the learning-based model 210a by plotting the number of iterations and the respective attribute specific loss values. The processor 202 checks if the training loss curve of each iteration is stable or unstable/fluctuating. If the training loss curve of the iteration is unstable/fluctuating, the processor 202 may use the fixed batch proportion logic (i.e., using only the plurality of attributes) to adjust the proportion of the one or more input batches. If the training curve loss of the iteration is stable, the processor 202 may use the dynamic batch proportion logic (i.e., using the plurality of attributes and the respective proportions of the attributes specific loss values obtained at the respective iteration) to adjust the proportions of sizes of the one or more input batches. Thus, the processor 202 uses the previous attribute specific loss values corresponding to the one or more groups of training datasets to adjust the proportions of sizes of the one or more input batches, after the number of iterations of training the learning-based model 210a at which the fluctuation of the training loss curve is stable. Further, the processor 202 may consider higher attribute specific loss values of the group of training datasets compared to the attribute specific loss values of the other groups of training datasets to adjust the proportions of the one or more input batches. For example, the processor 202 may adjust the proportions of the one or more input batches such that the size of the input batch corresponding to the group of training dataset with the higher attribute specific loss value may be larger, compared to the size of the other input batches.

Consider an example herein, wherein the processor 202 creates three input batches (B1, B2 and B3) from three datasets (D1, D2, D3). In such a scenario, the processor 202 may adjust the proportions of sizes of the three input batches as:

Input batch size=$B1:B2:B3$ wherein $$B1 = (B1 + B2 + B3) * \frac{L1}{L1 + L2 + L3},$$

$$B2 = (B1 + B2 + B3) * \frac{L2}{L1 + L2 + L3},$$

and $$B3 = (B1 + B2 + B3) * \frac{L3}{L1 + L2 + L3},$$

wherein L1, L2, and L3 corresponds to the attribute specific loss values of the group of training datasets/attributes corresponding to the input batches B1, B2, and B3 respectively.

On adjusting the proportion of the one or more input batches, the processor 202 performs forward passes of the one or more input batches to the learning-based module 210a to generate the one or more output batches for the respective one or more input batches. In general a module of any of the modules disclosed in this application may be implemented as instructions running on a processor such as a CPU, as a dedicated custom hardware circuit, or as an application specific integrated circuit, these are examples and non-limiting. The learning-based model 210a processes the one or more input batches to generate one or more output batches. In an embodiment herein, the learning-based model 210a may process the one or more input batches based on trainable/learnable parameters such as, but are not limited to, weights/coefficient (W) of the layers of the learning-based model 210a, bias (B), and so on. A function of generating the output batch, by the learning-based model 210a, for each input batch by processing each input batch may be intuitively inferred by one of ordinary skill in the art based on a type of the learning-based model 210a, and thus, its detailed description is omitted.

On generating the one or more output batches, the processor 202 aligns data distribution of one or more output batches generated for the one or more input batches that correspond to the one or more groups of training datasets tagged as the secondary dataset to data distribution of the one of the output batches generated for the input batch that corresponds to the group of training datasets tagged as the primary dataset. In an embodiment, the data distribution may be referred to ground-truth distribution (for example: in terms of histogram). In an embodiment, the processor 202 may align the data distribution of the one or more output batches corresponding to the one or more input batches of secondary dataset by applying a non-linear transformation method or a linear transformation method on the one or more output batches corresponding to the secondary dataset.

On aligning the data distribution of the one or more output batches, the processor 202 computes the attribute specific loss value for each output batch. The processor 202 computes the attribute specific loss value for each output batch by defining an attribute specific loss function for each group of training datasets and applying the attribute specific loss function of the respective group of training dataset on each output batch.

In an embodiment, the processor 202 may define a view construction loss for each group of training datasets corresponding to the scene understanding. The processor 202 applies the view construction loss on the output batch generated for the input batch corresponding to the scene understanding and computes the attribute specific loss value of the respective output batch. In an example herein, consider that two consecutive images (an example of the media) captured in a sequence ($I_t$ (original target) and $I_{t+1}$ (source)) using a camera as the training dataset for training the learning-based model 210a to perform an example task of depth estimation on an image. In such a scenario, the processor 202 may identify a relative pose between the original target image $I_t$ and the source image $I_{t+1}$ as $\hat{T}_{t \to t+1}$. Further, the processor 202 maps a homogeneous pixel of the original target image ($p_t \in I_t$) to a homogeneous pixel of the source image ($\hat{p}_{t+1} \in I_{t+1}$) as illustrated below:

$$\hat{p}_{t+1} \sim K\hat{T}_{t \to t+1}\hat{D}_t(p_t)K^{-1}p_t$$

wherein, K indicates a camera intrinsic matrix and $\hat{D}_t$ indicates an estimated depth for the input image $I_t$. Further, the processor 202 reconstructs a target image $\hat{I}_t$ (that has to be the same as the original target image $I_t$) considering at least one of, but is not limited to, a movement of the camera, constant illumination, and no occlusions. On reconstructing the target image $\hat{I}_t$, the processor 202 identifies an error between the reconstructed target image and the original image as supervision for the depth of images. The processor 202 calculates the view construction loss (an example attribute specific loss value) corresponding to the scene understanding using the below equation:

$$\text{Loss}_{self-supervised} = \alpha \frac{1 - SSIM(I_t - \hat{I}_t)}{2} + (1 - \alpha)|I_t - \hat{I}_t|$$

wherein α lies in [0, 1], and SSIM indicates structural similarity index measure.

In an embodiment, the processor 202 defines a pixelwise $L_1/L_2$ loss for each group of training datasets corresponding to the depth correctness. The processor 202 applies the pixelwise $L_1/L_2$ loss on the output batch generated for the input batch corresponding to the depth correctness and computes the attribute specific loss value of the respective output batch. The pixelwise $L_1/L_2$ loss may be a combination of a mean absolute error and a mean squared error. In an example, consider that the an image with a pixel point denoted as (x,y), may be used as the training dataset to train the learning-based model 210a for performing an example task of depth estimation on the image. In such a scenario, the processor 202 may calculate the mean absolute error and the mean squared errors using the below equations:

mean absolute error=Absolute_Value [$D(x,y)-D\_gt(x,y)$]

mean squared error=[$D(x,y)-D\_gt(x,y)$]$^2$ wherein, D represents an estimated depth map and D_gt represents a ground-truth depth map. The processor 202 may compute the pixelwise $L_1/L_2$ loss based on the mean absolute error and the mean squared error for all the pixel points of the image that include the ground-truth label. The processor 202 may ignore the pixel points of the image that do not include the ground truth label, while computing the pixelwise $L_1/L_2$ loss. In an example, the processor 202 may set a threshold value for computing the pixelwise $L_1/L_2$ loss and apply the mean absolute error or the mean squared error on the pixel points of the image based on the threshold value. If a difference between the estimated depth map and the ground-truth depth map is greater than the threshold value, the processor 202 applies the mean absolute error on the pixel points of the image that include the ground truth label. If the difference between the estimated depth map and the ground-truth depth map is less than the threshold value, the processor 202 applies the mean squared error on the pixel points of the image.

In an embodiment, the processor 202 defines a gradient difference loss for each group of training datasets (for example: the synthetic dataset) corresponding to the sharp edges and gaps. The processor 202 applies the gradient difference loss on the output batch generated for the input batch corresponding to the sharp edges and gaps and computes the attribute specific loss value of the respective output batch.

The synthetic datasets represent ideal training datasets for a fully supervised approach. In conventional approaches, a Conventional Neural Network (CNN) may be enabled to learn a one-to-one mapping between an input synthetic image and an output depth, for training a neural network to perform one or more tasks. In contrast, embodiments herein enable the processor 202 to use an intermediate gradient domain representation for computing the gradient difference loss, by considering the requirements of a smoothness and sharpness attribute from dense and pixel-perfect synthetic depth. The processor 202 may compute the gradient difference loss by inducing required positive attributes of dense pixel-perfect synthetic depth. In an embodiment, the CNN may not be penalized for a pixel-wise depth error.

In an example (as depicted in FIG. 60, for computing the gradient difference loss, the processor 202 transforms output and ground-truth depths into an intermediate representation using a fixed gradient operator. In an example, the fixed gradient operator may be a Sobel or Laplacian and gradient matching term, which may be applied on intermediate outputs. The gradient difference loss incentivizes the learning-based model 210a to output smooth and edge-aware maps. The gradient difference loss may be computed as:

$$Loss_{synthetic} = |\nabla_x D_{s,t} - \nabla_x D^*| + |\nabla_y D_{s,t} - \nabla_y D^*|$$

The processor 202 trains the learning-based model 210a to perform the one or more tasks on the media, based on a combination of the attribute specific loss values of the one or more output batches. For training the learning-based model 210a, the processor 202 accumulates and stores the attribute specific values computed for each output batch. The processor 202 determines a combined attribute specific loss value/combined loss value by applying a loss combination logic on the attribute specific loss values of the one or more output batches.

In an embodiment, the processor 202 may determine the combined attribute specific loss value using loss factors (an example loss combination logic) that have been pre-defined for each of the attributes/group of training datasets associated with the output batch. The processor 202 may pre-define the loss factors based on the importance or ranking of the attributes in training the learning-based model 210a to perform the one or more tasks on the media.

In another embodiment, the processor 202 may determine the combined attribute specific loss value using the loss factors (an example loss combination logic), which may be dynamically defined based on the output batches generated by the learning-based model 210a.

Consider an example scenario, wherein the processor 202 generates three output batches corresponding to three groups of training datasets/attributes (scene understanding, depth correctness, and sharps, and edges). In such a scenario, the processor 202 generates the view construction loss (L1) for the output batch corresponding to the attribute of scene understanding, the pixelwise $L_1/L_2$ for the output batch corresponding to the attribute of depth correctness, and the gradient difference loss for the output batch corresponding to the attribute of sharps and edges. The processor 202 further determines the combined attribute specific loss value/final loss as:

Combined attribute specific loss=$n1*L1+n2*L2+n3*L3$ wherein, n1, n2, and n3 are the loss factors corresponding to the attributes of scene understanding, the depth correctness, and the sharps and edges respectively.

In an embodiment, the n1, n2, and n3 may be pre-defined based on the importance or ranking of the attributes.

In another embodiment, the processor 202 may determine the n1, n2, and n3, by giving equal weightage to all the attributes as:

n1=max (L1,L2,L3)/L1 n2=max (L1,L2,L3)/L2 n3=max (L1,L2,L3)/L3

The processor 202 uses the combined attribute specific loss value and the attribute specific loss values of the one or more output batches to train the learning-based model 210a. The processor 202 trains the learning-based model 210a by performing a backward propagation and updating the parameters (the weights (W) and the bias (B)) of the learning-based model 210a using the combined specific attribute loss value and the attribute specific loss values of the one or more output batches.

In an example herein, consider that the processor 202 generates three output batches, computes the attribute specific loss values L1, L2, and L3 for the respective three output batches and computes the combined attribute specific loss value as L. In such a scenario, the processor 202 updates the weights ($W_1$, $W_2$, $W_3$ ... $W_n$, wherein $W_n$ indicates the weight of the nth layer of the learning-based model 210a) of the leaning-based model as:

$$W_n = W_n + \frac{\partial L1}{\partial W_n} + \frac{\partial L2}{\partial W_n} + \frac{\partial L3}{\partial W_n}$$

$$W_{n-1} = W_{n-1} + \frac{\partial L1}{\partial W_n} * \frac{\partial W_n}{\partial W_{n-1}} + \frac{\partial L2}{\partial W_n} * \frac{\partial W_n}{\partial W_{n-1}} + \frac{\partial L3}{\partial W_n} * \frac{\partial W_n}{\partial W_{n-1}}$$

In an embodiment, the processor 202 may train the learning-based model 210a in offline. In another embodiment, the processor 202 may train the learning-based model 210a online using the one or more attributes that have been prioritized by the user.

The processor 202 may store the trained learning-based model 210a in the memory 210. The processor 202 may be further configured to receive input media for performing the one or more tasks. In an example, the input media may be selected by a user. In another example, the processor 202 may receive the input media from the at least one external entity. The processor 202 processes the trained learning-based model 210a on the input media to generate a respective output media by performing the one or more tasks on the input media.

The media acquisition unit 204 referred herein may be at least one of, but is not limited to, a camera, a scanner, an imaging sensor, a digital camera, a thermal camera, an ultraviolet (UV) camera, a multispectral camera, or any other device/unit used to capture the media. In an example, the media acquisition unit 204 may be integrated within the electronic device 200. In another example, the media acquisition unit 204 may be communicatively coupled with the electronic device 200 using the communication network.

The display 206 may be configured to enable the user to interact with the electronic device 200. The display 206 may be configured to provide the output media to the user, which have been generated by performing the one or more tasks on the input media using the learning-based model 210a.

The communication interface 208 may be configured to enable the electronic device 200 to communicate with the at least one external entity using the communication network. The communication interface 208 may include components such as, but are not limited to, a wired communicator, a short-range communicator, a mobile/wireless communicator, a broadcasting receiver or any other unit that may enable the electronic device 200 to communicate with the at least one external entity.

The memory 210 may store at least one of, the training datasets, the attributes of the media, the parameters of the learning-based model 210a, the attribute specific loss values, the pre-defined loss factors, the pre-defined proportion for input batches, the trained learning-based model 210a, and so on. The memory 210 referred herein may include at least one type of storage medium, from among a flash memory type storage medium, a hard disk type storage medium, a multimedia card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

FIG. 3 depicts a model trainer 300 performable on the electronic device 200 for training the learning-based model 210a to perform the one or more tasks on the media, according to embodiments as disclosed herein. As depicted in FIG. 3, the memory 300 includes the model trainer 300, which may be executed by the processor 202 to train the learning-based model 210a to perform the one or more tasks on the media. The model trainer 300 includes an attribute generation module 302, a dataset classification module 304, an output batch generation module 306, and a loss computation module 308.

The attribute generation module 302 may be configured to identify the plurality of attributes of the media to train the learning-based model 210a. The attribute generation module 302 constructs the desired output for the learning-based model 210a and identifies the plurality of attributes from the constructed desired output of the learning-based model 210a. In an example, the plurality of attributes may include at least one of, but is not limited to, the scene understanding, the depth correctness, the sharp edges, and gaps, and so on, for the depth estimation. The attribute generation module 302 provides the output constructed for the learning-based model 210a and information about the plurality of attributes derived from the constructed output to the dataset classification module 304.

The dataset classification module 304 may be configured to classify the training datasets into the groups of training datasets. Each group of training datasets may carry any one of the plurality of attributes. The training datasets may include at least one of, the unlabelled media sequence dataset corresponding to the scene understanding, the real-world sparsely labelled dataset corresponding to the depth correctness, the synthetic dataset corresponding to the sharp edges and gaps, and so on. The dataset classification module 304 may also be configured to tag each group of training datasets as the primary dataset or the secondary dataset, based on the importance or the ranking of the respective attribute (i.e., the attribute carried by the group of training dataset). The dataset classification module 304 provides information about the groups of training datasets and the associated tags to the output batch generation module 306.

The output batch generation module 306 may be configured to sample the one or more input batches and generate the one or more output batches corresponding to the one or more input batches. The output batch generation module 306 samples the one or more input batches from the one or more groups of training datasets. The output batch generation module 306 adjusts the proportion of the one or more input batches based on the batch proportion logic. In an example, the output batch generation module 306 adjusts the proportion of the one or more input batches based on the attribute specific loss values and the ranking of attributes (i.e., using the fixed batch proportion logic). In another example, the generation module 306 adjusts the proportion of the one or more input batches based on the pre-defined proportion of the one or more input batches (i.e., using the dynamic batch proportion logic). On adjusting the proportion of the one or more input batches, the output batch generation module 306 feeds/forward passes the one or more input batches to the learning-based model 210a. The learning-based model 210a generates the one or more output batches by processing the one or more input batches. The learning-based model 210a provides information about the one or more output batches to the loss computation module 308.

The loss computation module 308 may be configured to generate the attribute specific loss values for the one or more output batches. On generating the one or more output batches by the learning based model, the loss computation module 308 aligns the data distribution of the one or more output batches corresponding to the one or more input batches that have been associated with the secondary groups of training datasets to the data distribution of the output batch corresponding to the input batch that has been associated with the primary group of training datasets. The loss computation module 308 further defines the attribute specific loss functions for the groups of training datasets/attributes and applies the attribute specific loss functions on the respective one or more output batches (i.e., the aligned output batches) to compute the attribute specific loss values of the one or more output batches. The loss computation module 308 determines the combined attribute specific loss value by applying the loss combination logic on the attribute specific loss values of the one or more output batches. The loss computation module 308 trains the learning-based model 210a by performing the backward propagation and updating the parameters of the learning-based model 210a using the combined attribute specific loss value and the attribute specific loss values of the one or more output batches.

FIGS. 2 and 3 show exemplary blocks of the electronic device 202, but it is to be understood that other embodiments are not limited thereon. In other embodiments, the electronic device 202 may include less or more number of blocks. Further, the labels or names of the blocks are used only for illustrative purpose and does not limit the scope of the embodiments herein. One or more blocks can be combined together to perform same or substantially similar function in the electronic device 202.

Figure 4:
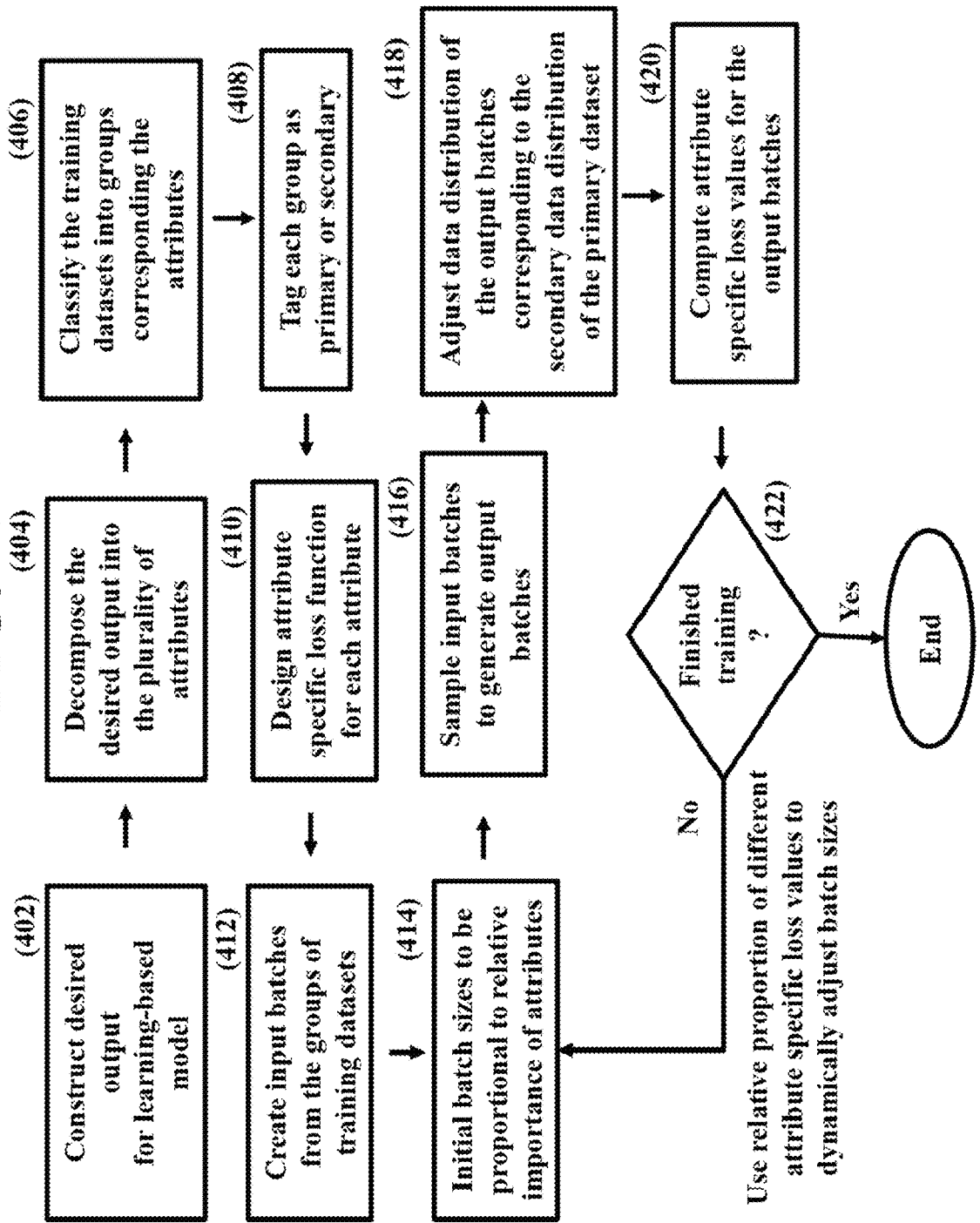
FIG. 4 is an example flow diagram depicting the training of the learning-based model, according to exemplary embodiments as disclosed herein.

FIG. 4 is an example flow diagram depicting the training of the learning-based model 210a, according to embodiments as disclosed herein.

The logic flow of FIG. 4 begins at step 402 in the upper left portion of FIG. 4. At step 402, the electronic device 200 constructs the desired output for the learning-based model 210a, based on the one or more tasks to be performed on the media. At step 404, the electronic device 200 decomposes the desired output of the learning-based model 210a into the plurality of attributes. At step 406, the electronic device 200 collects the training datasets and classifies the training datasets into the groups. Each group of training datasets may correspond to at least one of the plurality of attributes. At step 408, the electronic device 200 tags each group of training datasets as the primary dataset or the secondary dataset. At step 410, the electronic device 200 designs the attribute specific loss function for each of the plurality of attributes.

At step 412, the electronic device 200 creates the one or more input batches from the groups of training datasets. Thus, each input batch may correspond to the at least one group of training datasets/at least one attribute. At step 414, the electronic device 200 initially initializes the proportion of the one or input batches based on the importance or the ranking of the respective attributes (i.e., the attributes carried by the groups of training datasets corresponding to the one or more input batches). At step 416, the electronic device 200 performs a forward propagation and feeds the one or more input batches to the learning-based model 210a. The learning-based model 210a processes the one or more input batches, and generates the one or more output batches corresponding to the one or more input batches.

At step 418, the electronic device 200 adjusts the data distribution of the one or more output batches corresponding to the secondary dataset to the data distribution of the output batch corresponding to the primary dataset. At step 420, the electronic device 200 computes the attribute specific loss values for the one or more output batches by applying the respective attribute specific loss functions on the one or more output batches. The electronic device 200 computes the combined attribute specific loss by applying the loss combination logic on the attribute specific loss values of the one or more output batches. The electronic device 200 then trains the learning-based model 210a by updating the parameters of the learning-based model 210a using the combined attribute specific loss and the attribute specific loss values of the one or more output batches.

At step 422, the electronic device 200 checks if the training of the learning-based model 210a has been completed. The electronic device 200 checks if the training loss curve obtained from the attribute specific loss values computed for the output batches of each iteration is stable or unstable/fluctuating. If the training loss curve of the iteration is unstable/fluctuating, the processor 202 determines that the training of the learning-based model 210a has not been completed. If the training curve loss of the iteration is stable, the processor 202 determines that the training of the learning-based model 210a has been completed. If the training of the learning-based model 210a has been completed, at step 424, the electronic device 200 ends the process of training the learning-based model 210a. If the training of the learning-based model 210a has not been completed, the electronic device 200 performs the step 414-422, wherein at step 412, the electronic device 200 dynamically tunes the parameters of the learning-based model 210a using the relative proportion of the respective attribute specific loss values. The various actions may be performed in the order presented, in a different order or simultaneously. Further, in some embodiments, some actions listed in FIG. 4 may be omitted.

Figure 5:
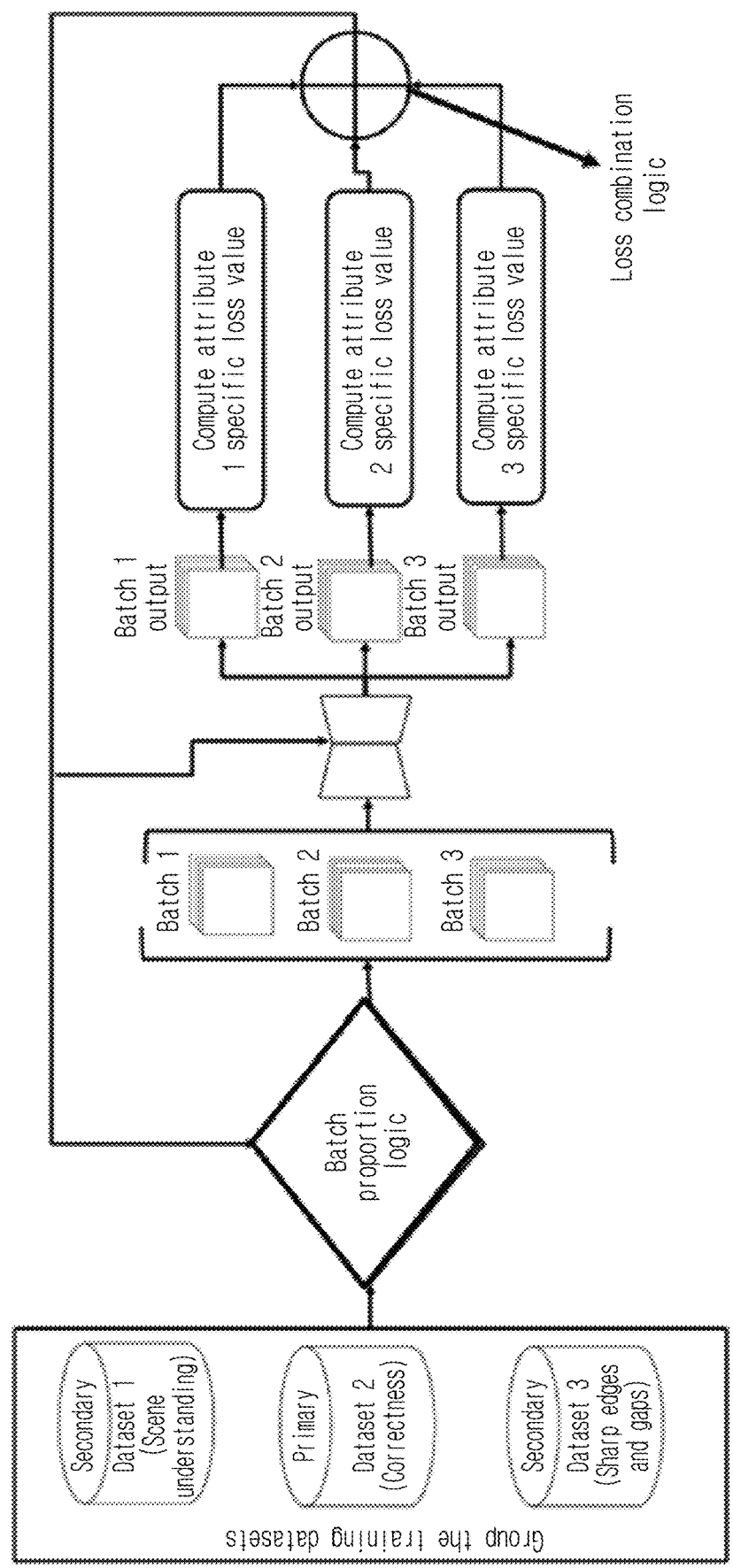
FIG. 5 is an example conceptual diagram depicting the training of the learning-based model to perform the one or more tasks on the media, according to exemplary embodiments as disclosed herein.

FIG. 5 is an example conceptual diagram depicting the training of the learning-based model 210a to perform the one or more tasks on the media, according to embodiments as disclosed herein.

Embodiments herein explain the training of the learning-based model 210a to perform an example task of depth estimation on images, but it may be obvious to a person skilled in the art that any other tasks may be considered.

The electronic device 200 constructs the desired/ideal output (for example: an ideal depth map) for the learning-based model 210a. The electronic device 200 decomposes the ideal output into the attributes required for the training of the learning-based model 210a to perform the depth estimation of the images. In an example herein, the attributes include scene understanding/attribute 1, depth correctness/attribute 2, and sharp edges, and gaps/attribute 3.

The electronic device 200 collects/forms the training datasets and classifies the training datasets into three groups of training datasets (a dataset 1/unlabelled media sequence dataset, a dataset 2/real-world sparsely labelled dataset, and a dataset 3/synthetic dataset). The electronic device 200 forms the training datasets by capturing images and applying at least one of, the computer vision techniques, the computer graphics methods, or the like on the captured images, as depicted in FIG. 6a. The electronic device 200 may capture the videos (for example: videos of 10-15 seconds) and extract the image frames from the videos, where the extracted image frames constitute the dataset 1/unlabelled media sequence dataset. The unlabelled media sequence dataset does not include any ground-truth. The electronic device 200 may capture stereo images/dual camera images and applies the computer vision techniques on the captured stereo images to compute sparse depth maps, wherein the images computed with the sparse depth maps constitute the dataset 2/real-world sparsely labelled dataset. The real-world sparsely labelled dataset may sparse and not pixel perfect. The electronic device 200 may create images using computer graphics methods, wherein the created images may be RGB images and the created images constitute the dataset 3/synthetic dataset. The synthetic dataset may include the images of the high quality pixel perfect dense depth ground-truth.

Each group of datasets carries the at least one attribute. In an example, as depicted in FIGS. 6b and 6d, the dataset 1/unlabelled media sequence dataset, the dataset 2/real-world sparsely labelled dataset, and the dataset 3/synthetic dataset may correspond to the scene understanding (attribute 1), the depth correctness (attribute 2), the sharp edges and gaps (attribute 3) respectively. The unlabelled media sequence dataset/scene understanding may enable the learning-based model 210a to determine the relationship between objects in the image and to generate a high level or a painting-based depth map for the image (a rough, but semantically correct image). "Semantically correct" may be used to mean that elements of the depth map are properly ordered in terms of indication of depth. In an example, as depicted in FIG. 6b, the unlabelled media sequence dataset/scene understanding may enable the learning-based model 210a to determine the relationship between human and surrounding object (for example: leaves/plant) in an example image. However, the unlabelled media sequence dataset/scene understanding does not enable the learning-based model 210a to identify leaf structures or depth variations in the depth map of the example image.

The real-world sparsely labelled dataset/depth correctness may enable the learning-based model 210a to convert the high-level rough sketch or the painting-based depth map (determined using the unlabelled media sequence dataset) into actual finer structures of the objects in the image. In an example, as depicted in FIG. 6b, the real-world sparsely labelled dataset/depth correctness enables the learning-based model 210a to convert the high-level rough sketch depth map or painting to actual finer structures such as, but are not limited to, shapes of the leaves, depth variations within the plant, and so on (present in the example image). In FIG. 6b, the depth maps are on the right for each dataset.

The synthetic dataset/sharp edges, and gaps may enable the learning-based model 210a to output the depth map with smooth variations by determining the edges and gaps between the objects in the image. In an example, as depicted in FIG. 6b, the synthetic dataset may enable the learning-based model 210a to determine small gaps or holes between the leaves of the plant (present in the example image).

Thus, using the unlabelled media sequence dataset, the real-world sparsely labelled dataset, and the synthetic dataset as the training dataset enables the learning-based model 210a to determine the output image with good scene understanding, and depth correctness and by preserving the sharp edges, and gaps, as depicted in FIG. 6c.

On classifying the training datasets into the three groups, the electronic device 200 tags each group of training datasets as the primary dataset or the secondary dataset. In an example herein, the electronic device 200 tags the unlabelled media sequence dataset/dataset 1 and the synthetic dataset/dataset 3 as the secondary dataset, and the real-world sparsely labelled dataset/dataset 2 as the primary dataset, as the real-world sparsely labelled dataset has more importance in estimating the depth maps, compared to the dataset 1 and the dataset 3.

Figure 6E:
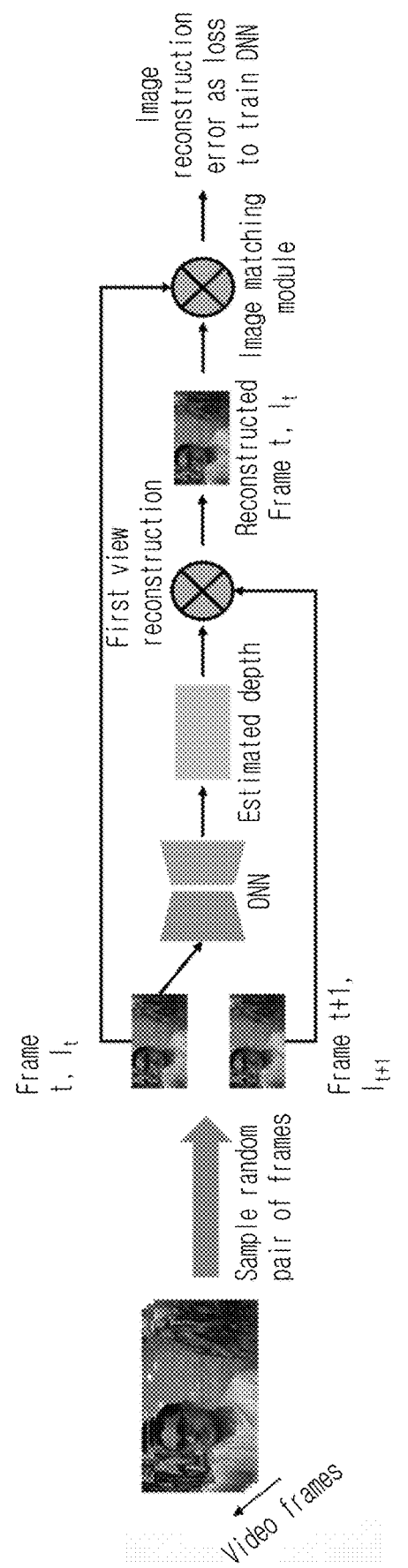
FIG. 6e is an example diagram depicting a method for defining a view construction loss for an output batch corresponding to a scene understanding attribute, according to exemplary embodiment as disclosed herein.
Figure 6F:
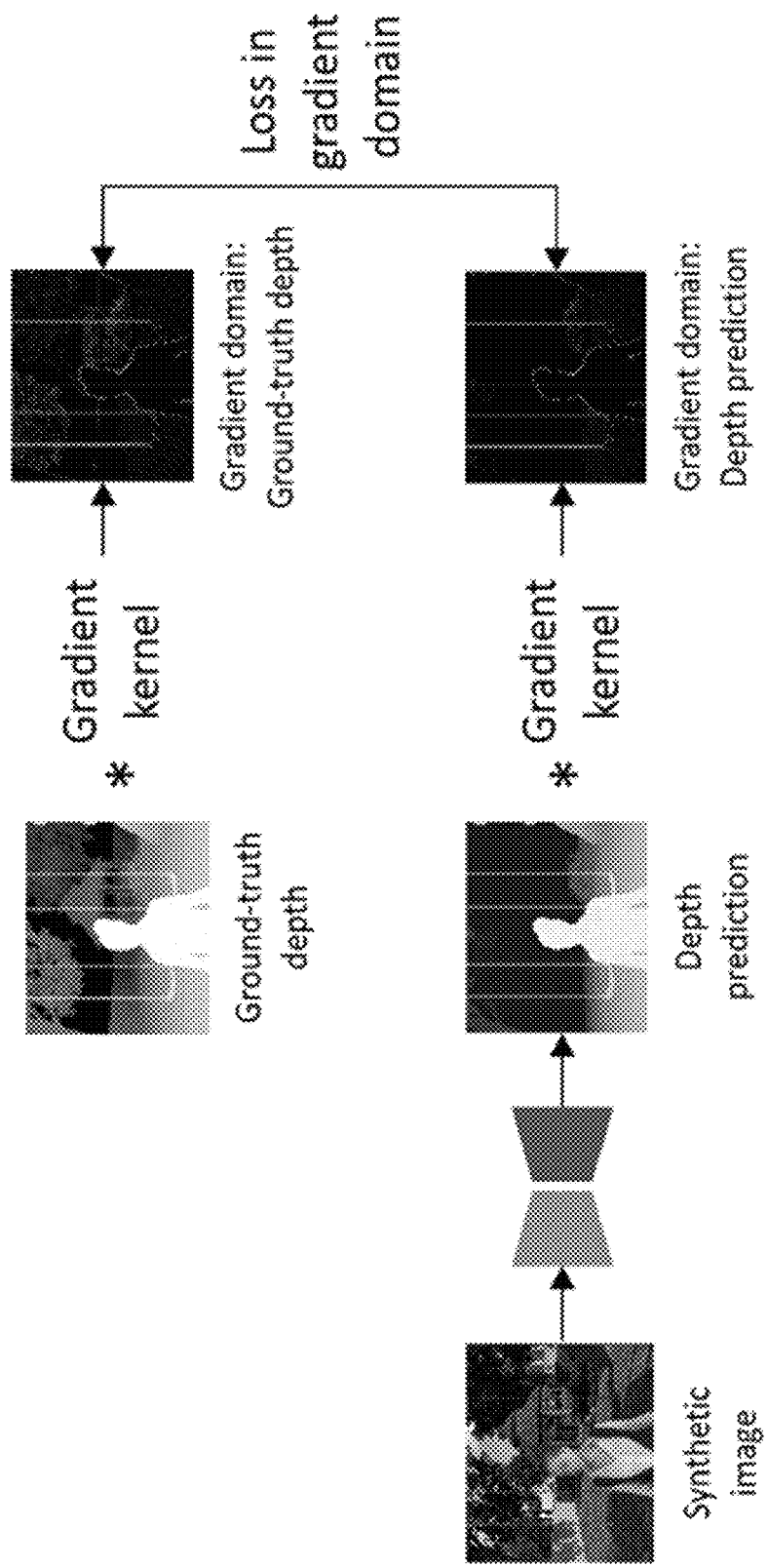
FIG. 6f is an example diagram depicting a method for defining a gradient difference loss for an output batch corresponding to a synthetic dataset attribute, according to exemplary embodiments as disclosed herein.

The electronic device 200 further determines the attribute specific loss function for each of the attributes carried by the group of training datasets. In an example, the electronic device 200 defines the view construction loss as the attribute specific loss function for the scene understanding (as depicted in FIG. 6e). In an example, the electronic device 200 defines the pixelwise $L_1/L_2$ loss as the attribute specific loss function for the depth correctness. In an example, the electronic device 200 defines the gradient difference loss as the attribute specific loss function for the sharp edges and gaps (as depicted in FIG. 6O).

Figure 7A:
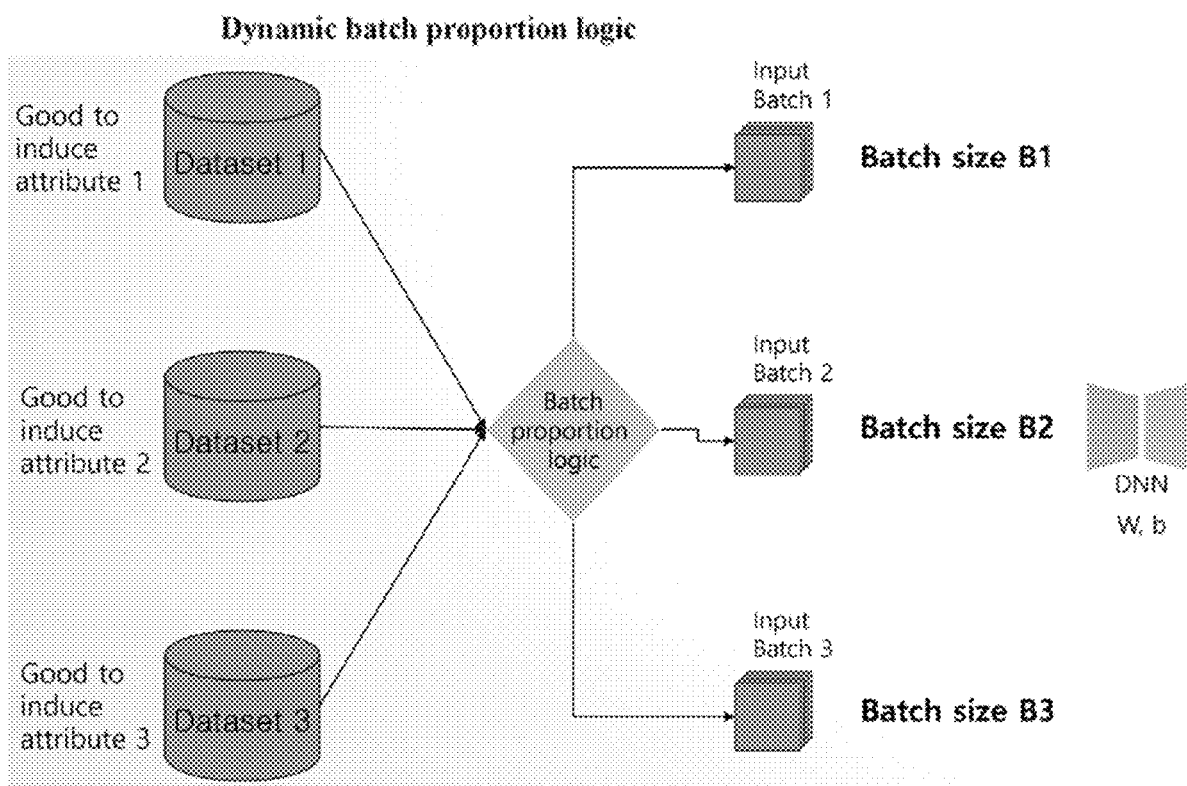
FIG. 7a is an example diagram depicting a batch proportion logic, according to exemplary embodiments as disclosed herein.

Further, the electronic device 200 creates the one or more input batches corresponding to the groups of training datasets. In an example herein, as depicted in FIG. 7a, the electronic device 200 creates three input batches (B1, B2, and B3) from three groups of training datasets.

Figure 7B:
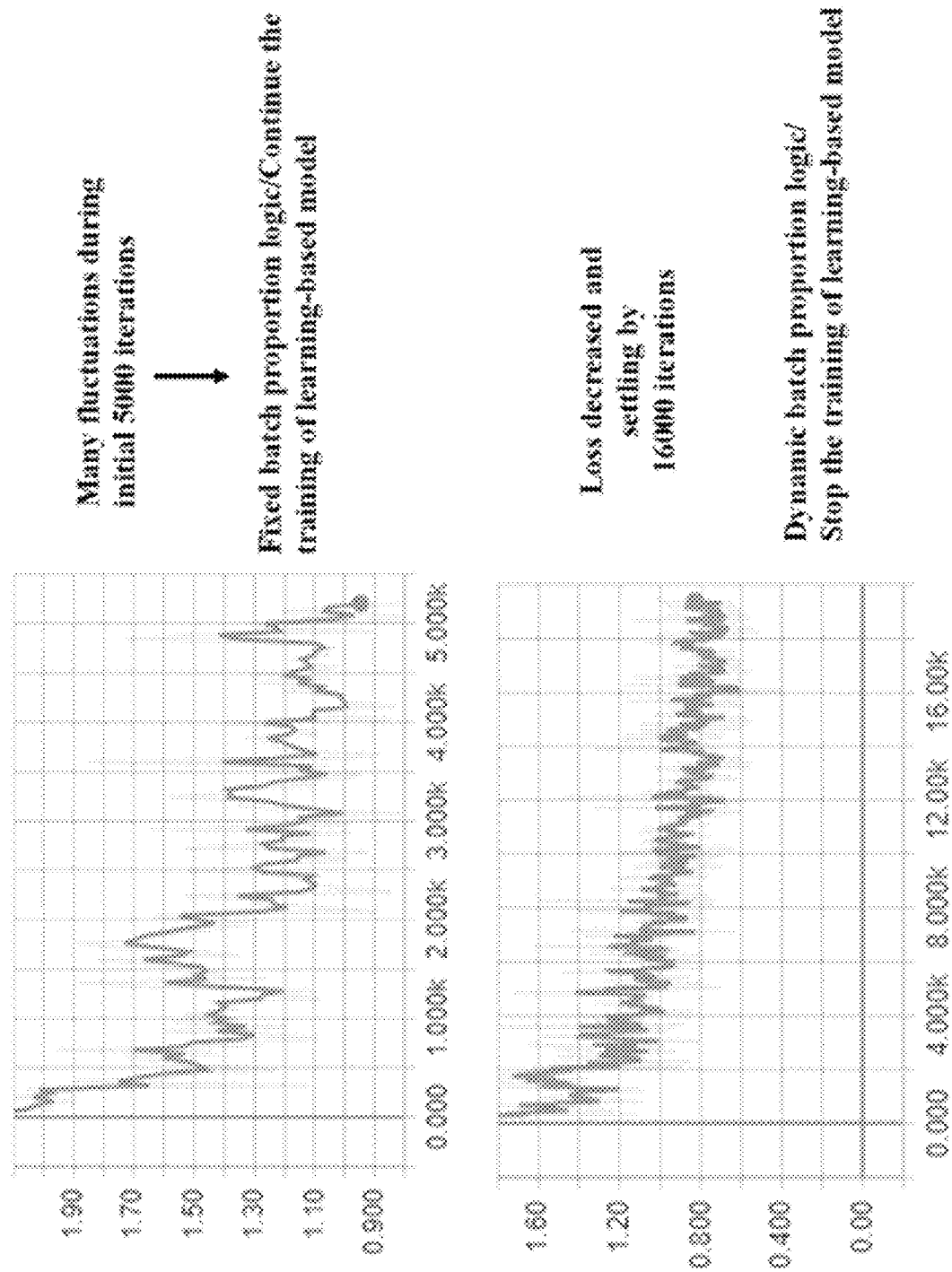
FIG. 7b is an example diagram depicting a training loss curve, which is analyzed to use a fixed batch proportion logic or a dynamic batch proportion logic according to exemplary embodiments as disclosed herein.

In an embodiment, the electronic device 200 adjusts the proportion of the three input batches, based on the importance of the corresponding three attributes/groups of training datasets and/or the attribute specific loss values computed previously for the output batches corresponding to the attributes/groups of training datasets of the respective three input batches (i.e., using the batch proportion logic). The electronic device 200 may use only the plurality of attributes based on their ranking or importance to adjust the proportion of the one or more input batch at an initial stage of training the learning-based model 210a, as the training loss curve obtained at the initial stage of training the learning-based model 210a may not be stable, as depicted in FIG. 7b. The electronic device 200 may use the attributes and the attribute specific loss values for training the learning-based model 210a, after the number of iterations of training the learning-based model 210a, at which the training curve is stable, as depicted in FIG. 7b. In an example, the electronic device 200 may adjust the proportion of the three input batches as:

Input batch size=*B*1:*B*2:*B*3 wherein $$B1 = (B1 + B2 + B3) * \frac{L1}{L1 + L2 + L3},$$

$$B2 = (B1 + B2 + B3) * \frac{L2}{L1 + L2 + L3},$$

and $$B3 = (B1 + B2 + B3) * \frac{L3}{L1 + L2 + L3},$$

wherein B1 is the input batch corresponding to the unlabelled media sequence dataset/scene understanding, the B2 is the input batch corresponding to the real-world sparsely labelled dataset/depth correctness, and the B3 is the input batch corresponding to the synthetic dataset/sharp edges and gaps, wherein the L1 is the attribute specific loss value computed for the previous output batch corresponding to the unlabelled media sequence dataset/scene understanding, the L2 is the attribute specific loss value computed for the previous output batch corresponding to the real-world sparsely labelled dataset/depth correctness, and the L3 is the attribute specific loss value corresponding to the sharp edges and gaps.

In another embodiment, the electronic device 200 may adjust the proportion of the three input batches based on the pre-defined proportion of the input batches. The processor 202 may pre-define the proportion of the input batches based on the importance or the ranking of the plurality of attributes in training the learning-based model 210a to perform the depth estimation of the images.

Figure 8A:
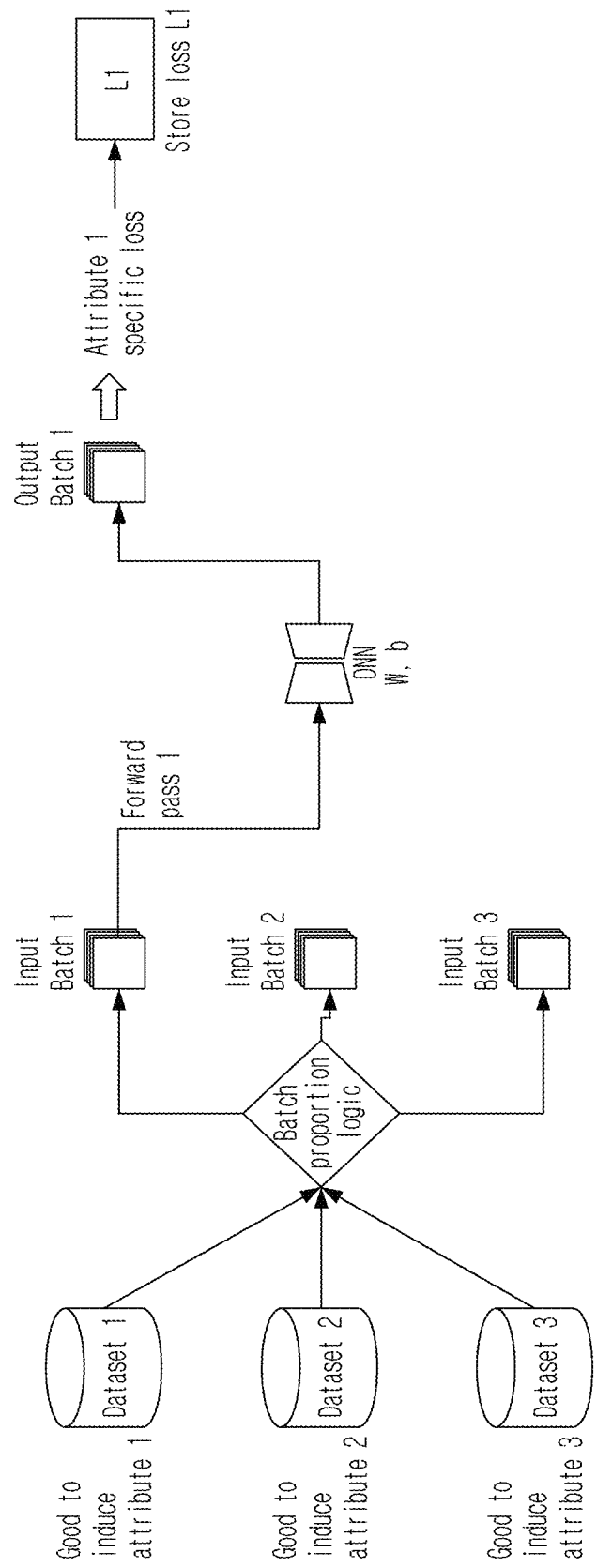
FIGS. 8a, 8b, and 8c are example diagrams depicting computation of attribute specific loss values for output batches each corresponding to one of groups of training datasets, according to exemplary embodiments as disclosed herein.

On adjusting the proportion of the three input batches, the electronic device 200 feeds the input batches B1, B2, and B3 to the learning-based model 210a. As depicted in FIG. 8a, the learning-based model 210a processes the input batch B1 and generates an output batch 1 for the B1. On generating the output batch 1, the electronic device 200 computes the attribute specific loss value L1 for the output batch 1. The electronic device 200 applies the attribute specific loss function corresponding to the scene understanding on the output batch 1, (since the output batch 1 is generated for the B1 corresponding to the unlabelled media sequence labelled dataset/scene understanding) and computes the attribute specific loss value L1 for the output batch 1. The attribute specific loss function corresponding to the scene understanding may be the view constriction loss.

Figure 8B:
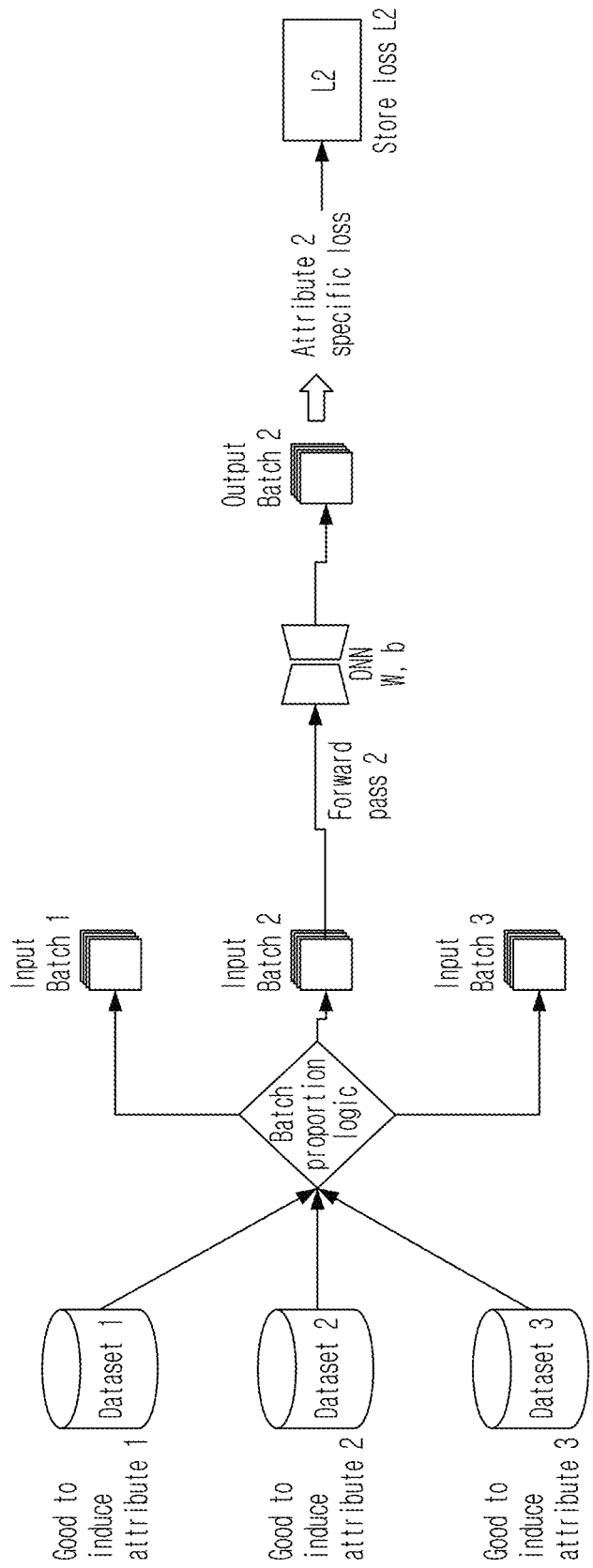

On generating the output batch 1, the learning-based model 210a processes the input batch B2 and generates an output batch 2 for the B2, as depicted in FIG. 8b. On generating the output batch 2, the electronic device 200 computes the attribute specific loss value L2 for the output batch 2. The electronic device 200 applies the attribute specific loss function corresponding to the depth correctness on the output batch 2, (since the output batch 2 is generated for the B2 corresponding to the real-world sparsely labelled dataset/depth correctness) and computes the attribute specific loss value L2 for the output batch 2. The attribute specific loss function corresponding to the depth correctness may be the pixelwise $L_1/L_2$ loss.

Figure 8C:
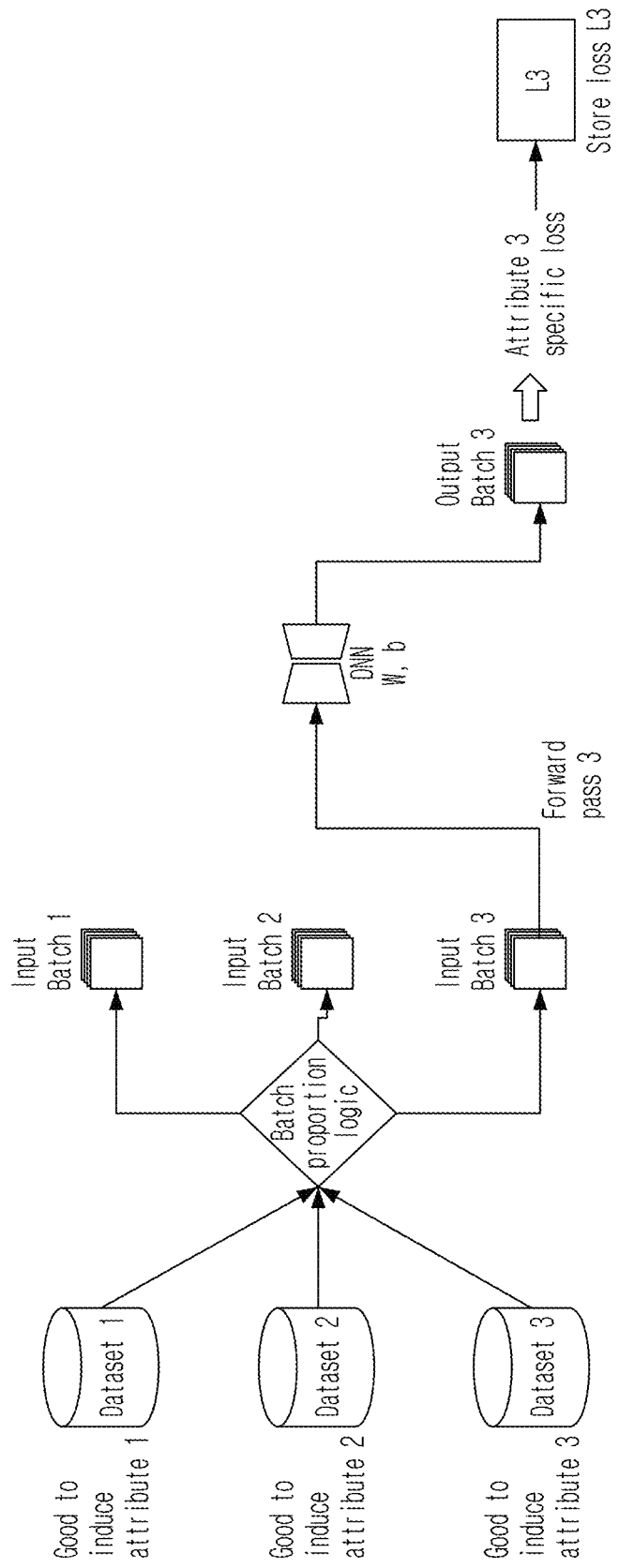

On generating the output batch 1, the learning-based model 210a processes the input batch B3 and generates an output batch 3 for the B3, as depicted in FIG. 8c. On generating the output batch 3, the electronic device 200 computes the attribute specific loss value L3 for the output batch 3. The electronic device 200 applies the attribute specific loss function corresponding to the sharp edges and gaps on the output batch 3, (since the output batch 3 is generated for the B3 corresponding to the synthetic dataset/ sharp edges and gaps) and computes the attribute specific loss value L3 for the output batch 3. The attribute specific loss function corresponding to the sharp edges and gaps may be the gradient difference loss.

Figure 9A:
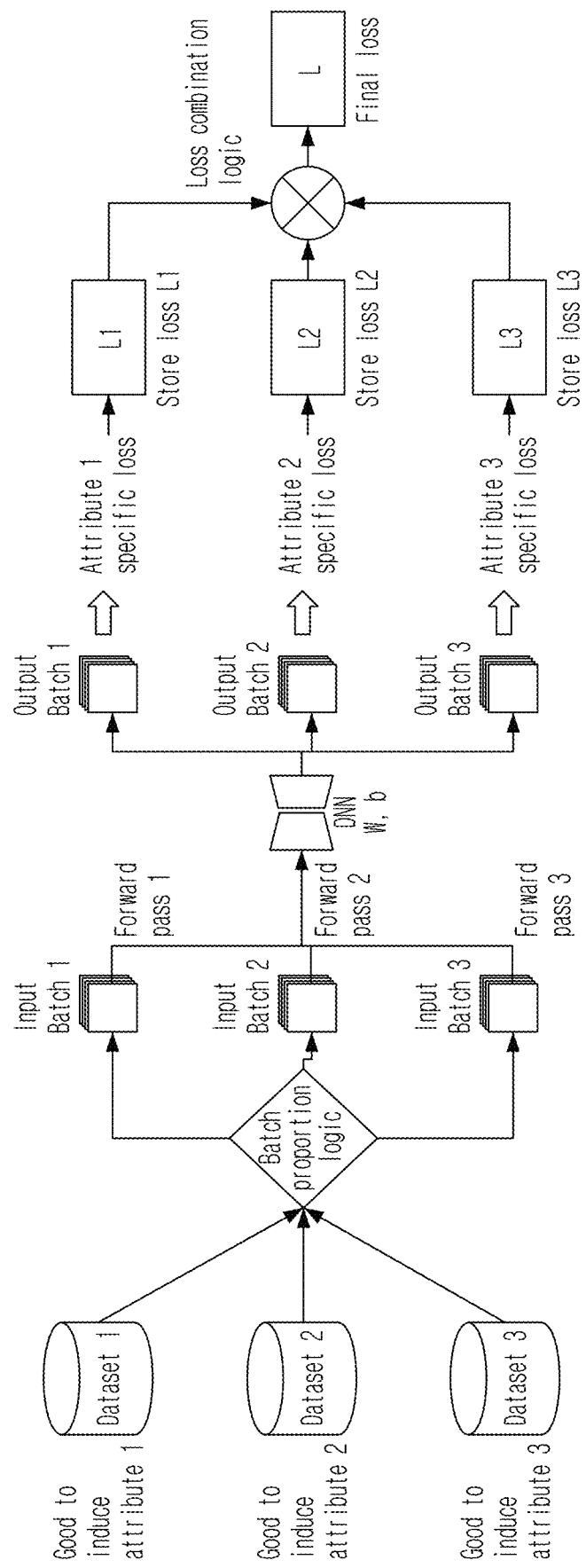
FIGS. 9a-9d are example diagrams depicting training of the learning-based model using the attribute specific loss values of the output batches and a combined attribute specific loss value, according to exemplary embodiments as disclosed herein.

The electronic device 200 further stores the attribute specific loss values L1, L2, and L3 in the memory 210. The electronic device 200 determines the combined attribute specific loss value L, by applying the loss combination logic on the attribute specific loss values L1, L2, and L3, as depicted in FIG. 9a.

Figure 9B:
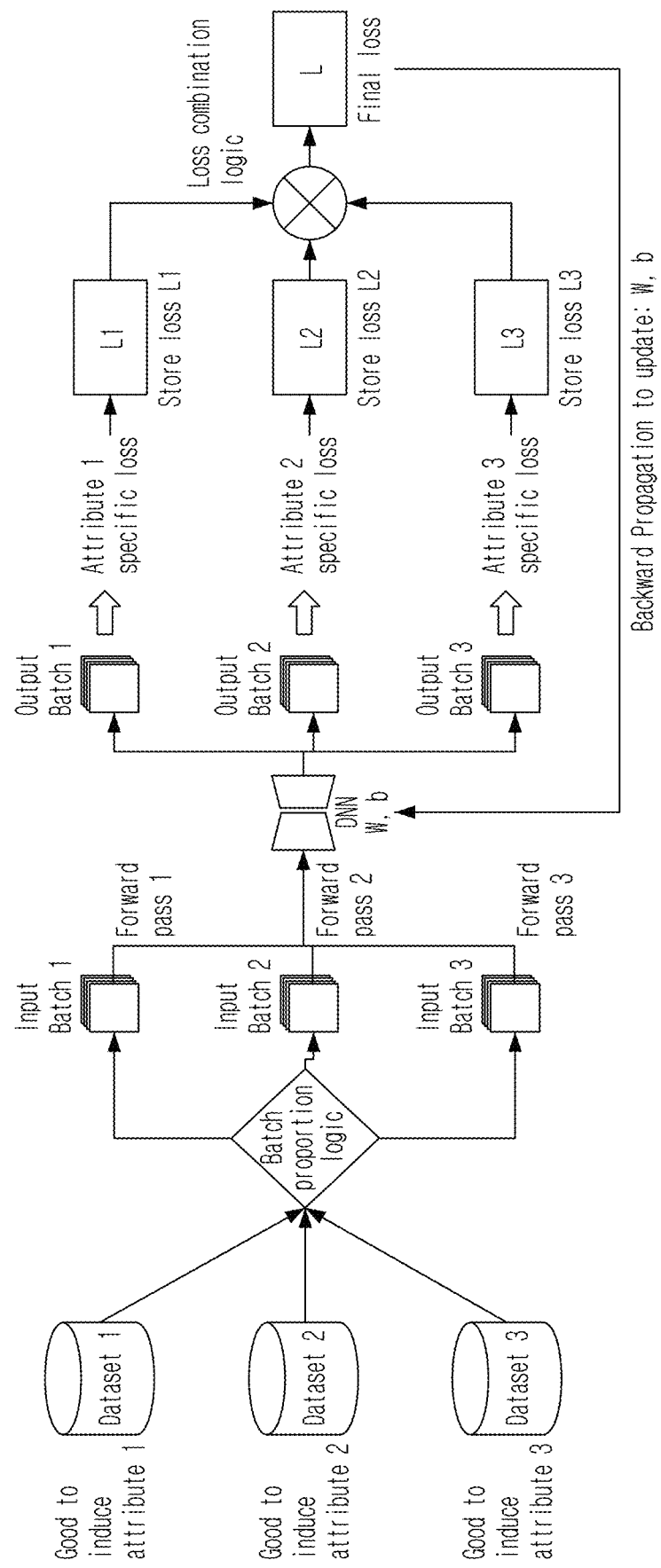
Figure 9C:
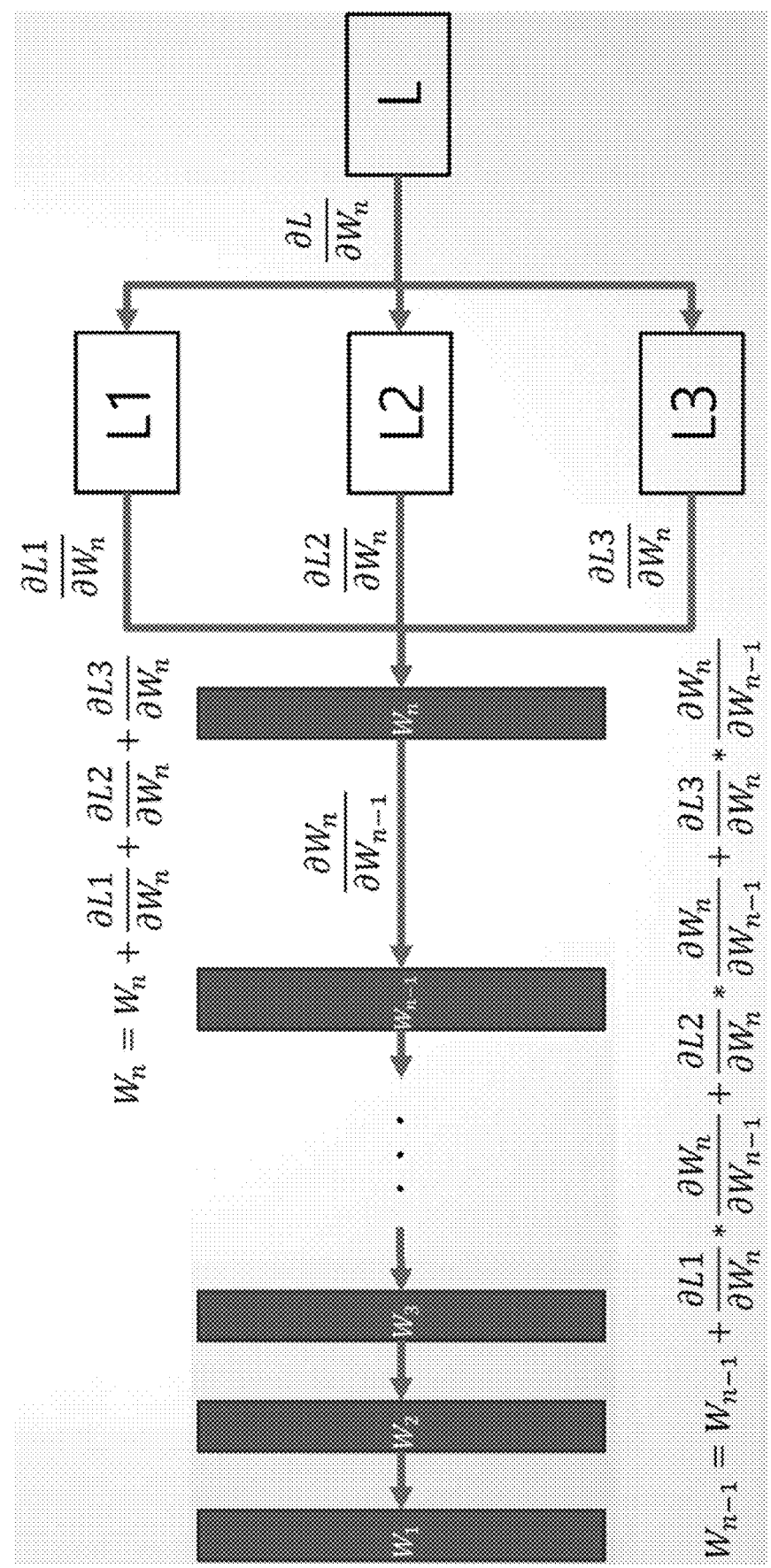
Figure 9D:
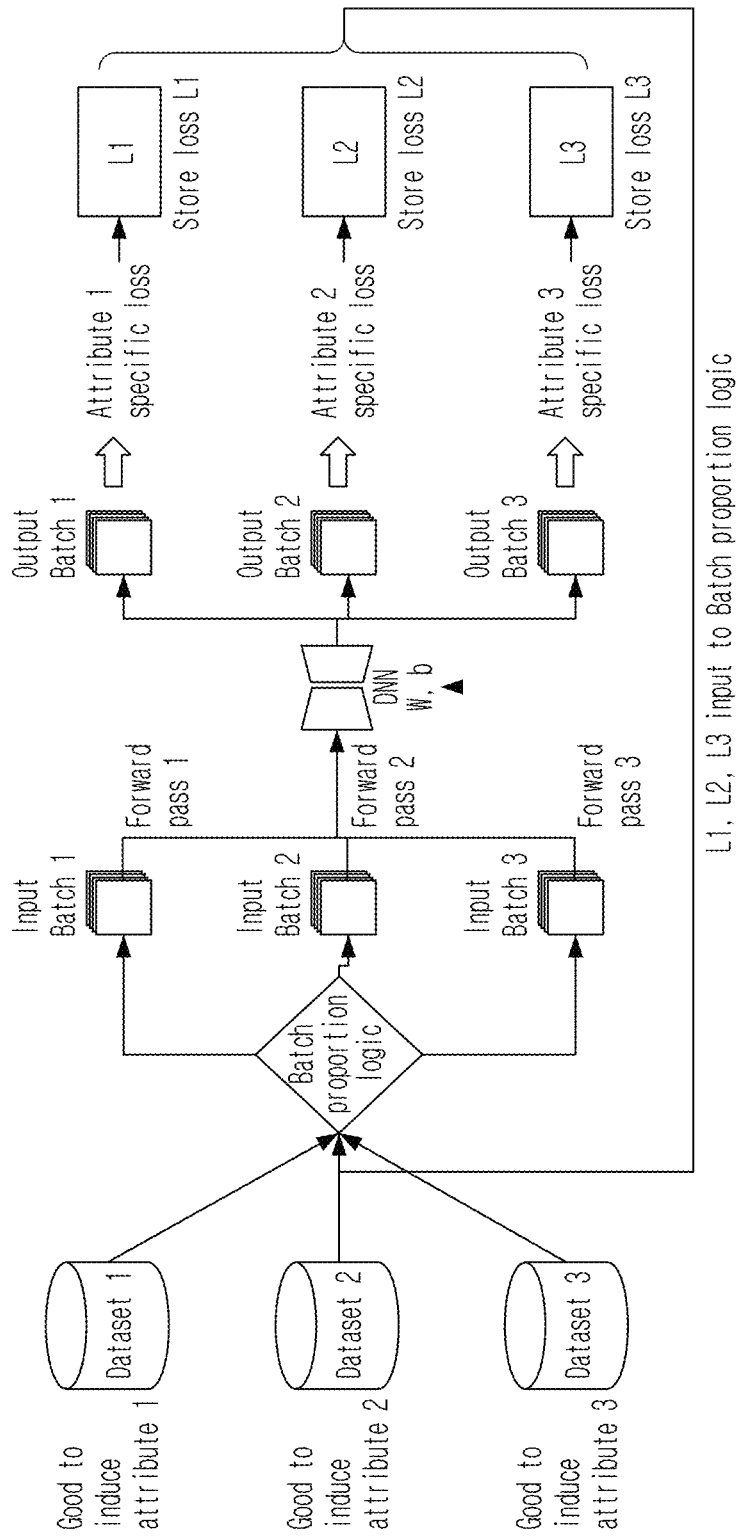

On determining the combined attribute specific loss value, as depicted in FIG. 9b, the electronic device 200 trains the learning-based model 210a by performing the backward propagation to update the parameters (the weights (W), the bias (B)) of the learning-based model 210a using the combined attribute specific loss value L and the attribute specific loss values L1, L2, and L3. In an example herein, as depicted in FIG. 9c, the electronic device 200 updates the weights of the learning-based model 210a as:

$$W_n = W_n + \frac{\partial L1}{\partial W_n} + \frac{\partial L2}{\partial W_n} + \frac{\partial L3}{\partial W_n}$$

$$W_{n-1} = W_{n-1} + \frac{\partial L1}{\partial W_n} * \frac{\partial W_n}{\partial W_{n-1}} + \frac{\partial L2}{\partial W_n} * \frac{\partial W_n}{\partial W_{n-1}} + \frac{\partial L3}{\partial W_n} * \frac{\partial W_n}{\partial W_{n-1}}$$

wherein, $W_n$ is the nth layer of the learning-based model 210a and the $W_{n-1}$ is the (n−1)th layer of the learning-based model 210a.

The electronic device 200 also updates the batch proportion logic based on the computed attribute specific loss values L1, L2, and L3, for future adjustment of the proportion of the input batches.

The electronic device 200 may store the trained learning-based model 210a in the memory 210. The electronic device 200 may be further configured to receive input images (i.e., the images selected from the user from a gallery application or the images received from the at least one external entity) and processes the trained learning-based model 210a to generate output images corresponding to the input images by performing the depth estimation.

FIGS. 10a-10e are example diagrams depicting use case scenarios of performing an example task of depth estimation on images using the trained learning-based model 210a, according to embodiments as disclosed herein.

Figure 10A:
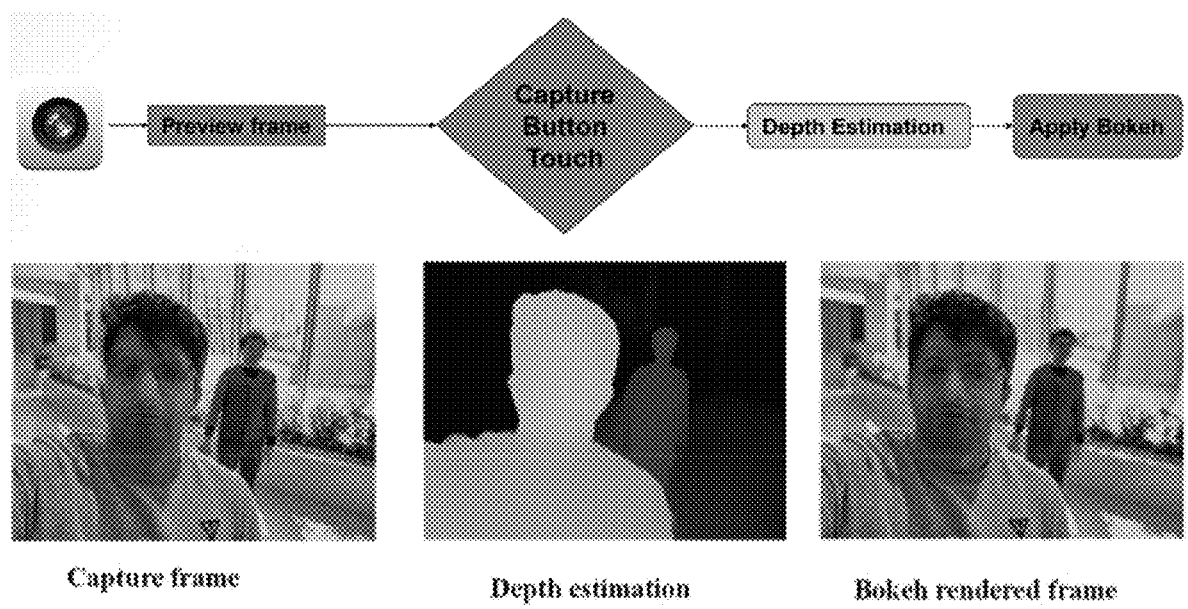
FIGS. 10a-10d are example diagrams depicting use case scenarios of performing an example task of depth estimation on images using the trained learning-based model, according to exemplary embodiments as disclosed herein.

In an example scenario, as depicted in FIG. 10a, the electronic device 200 captures an input image frame using a camera and processes the learning-based model 210a to generate an output image for Bokeh rendering by performing the depth estimation.

Figure 10B:
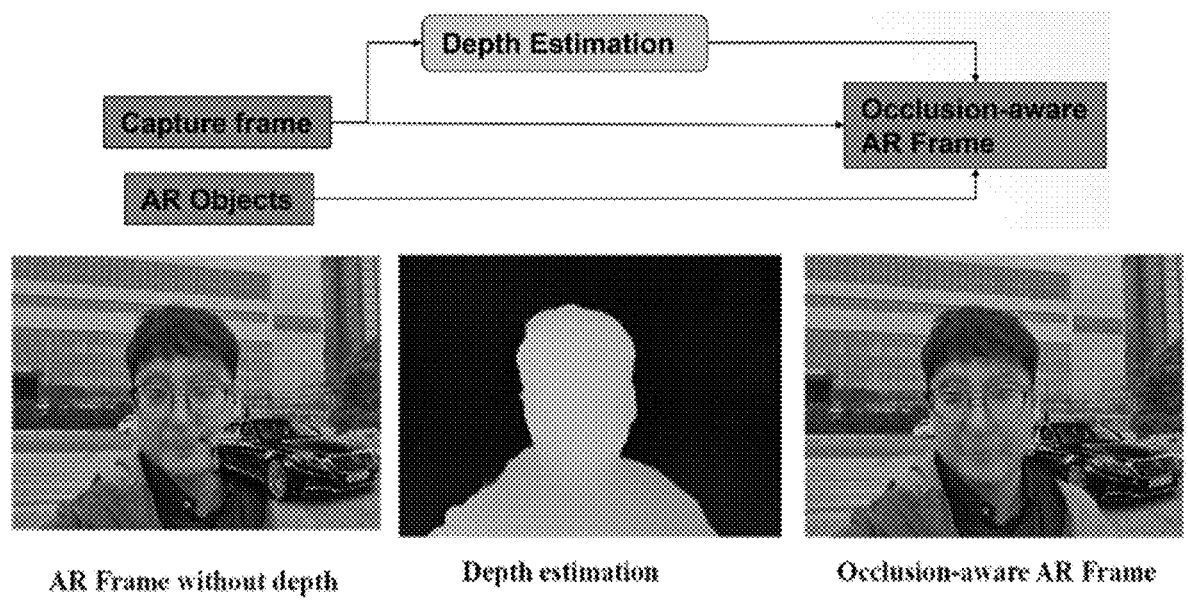

In an example scenario, as depicted in FIG. 10b, the electronic device 200 captures an input image frame and receives Augmented Reality (AR) objects from the user. In such a scenario, the electronic device 200 processes the learning-based model 210a to perform the depth estimation on the input image and generate an output image, wherein the generated output image is an occlusion-aware AR image frame.

Figure 10C:
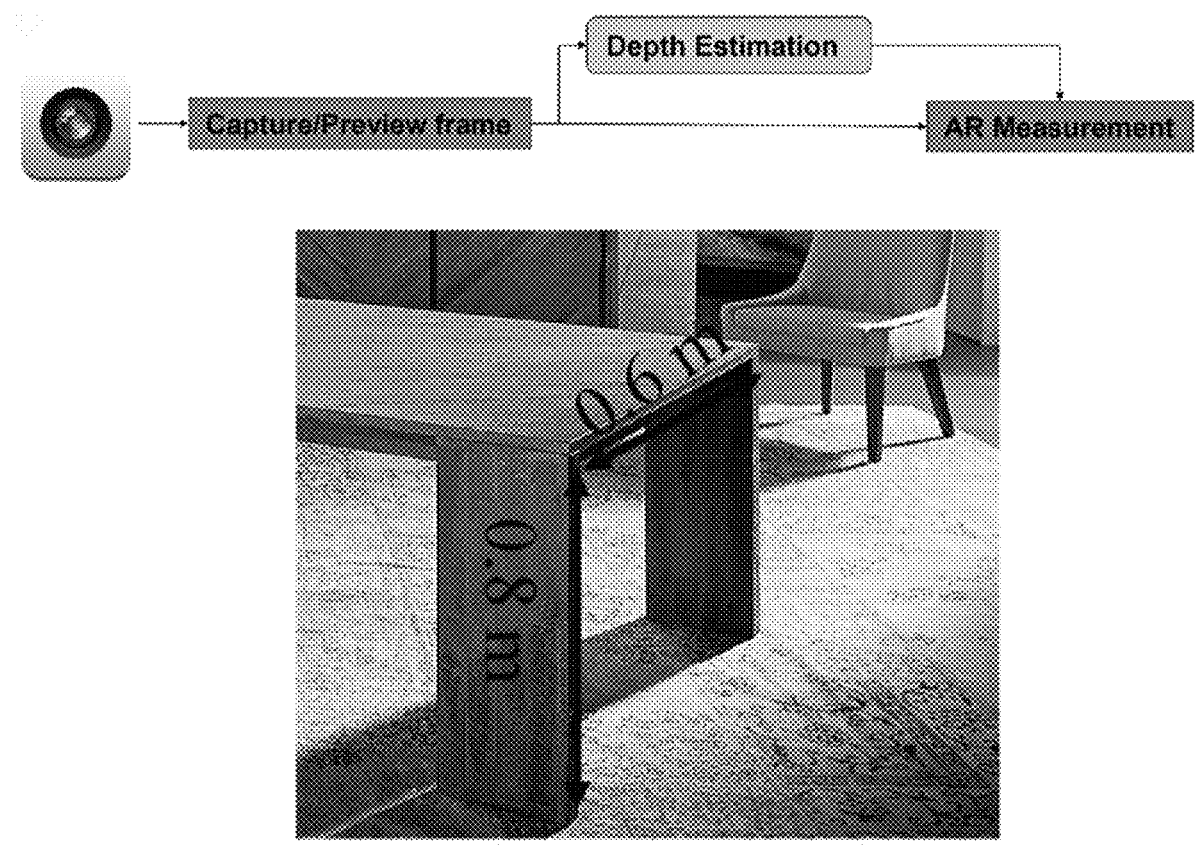

In an example scenario, as depicted in FIG. 10c, the electronic device 200 captures an input image, processes the learning-based model 210a to perform the depth estimation on the input image and determines AR measurement of the input image.

Figure 10D:
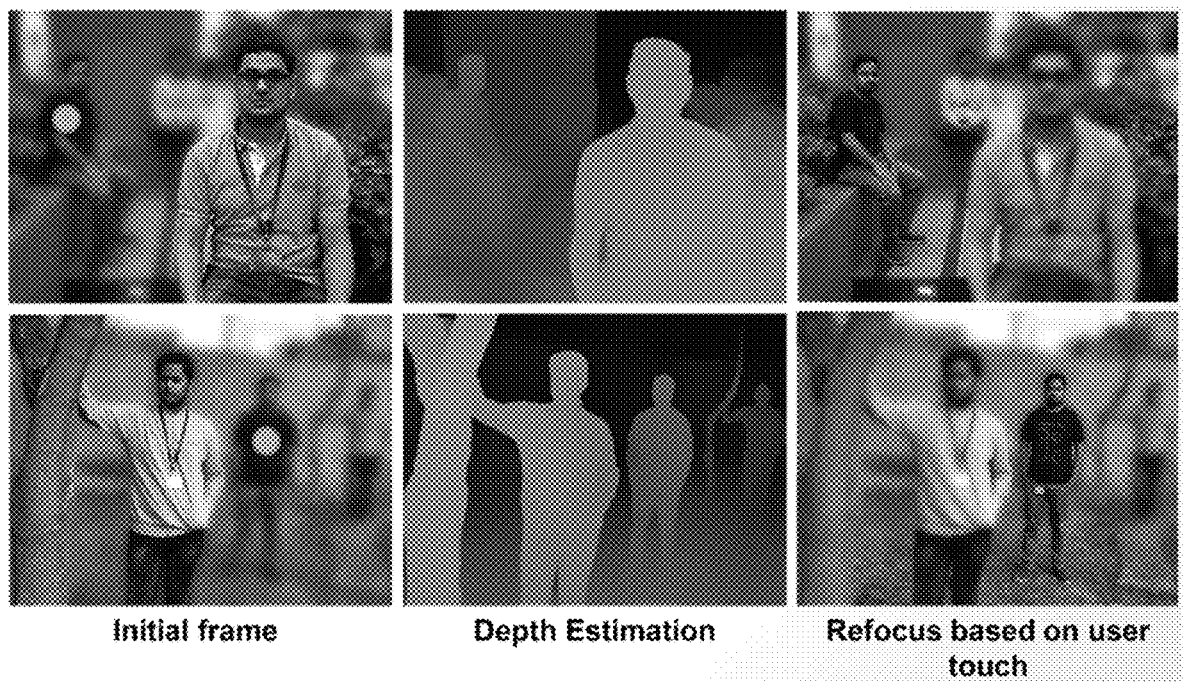

In an example scenario, as depicted in FIG. 10d, in order to render natural output images, the electronic device 200 adjusts all regions in input images for refocus, by processing the learning-based model 210a.

In an example scenario, the electronic device 200 makes Dolly effect of an input video more natural by processing the learning-based model 210a to perform the depth estimation on the input video.

Figure 11:
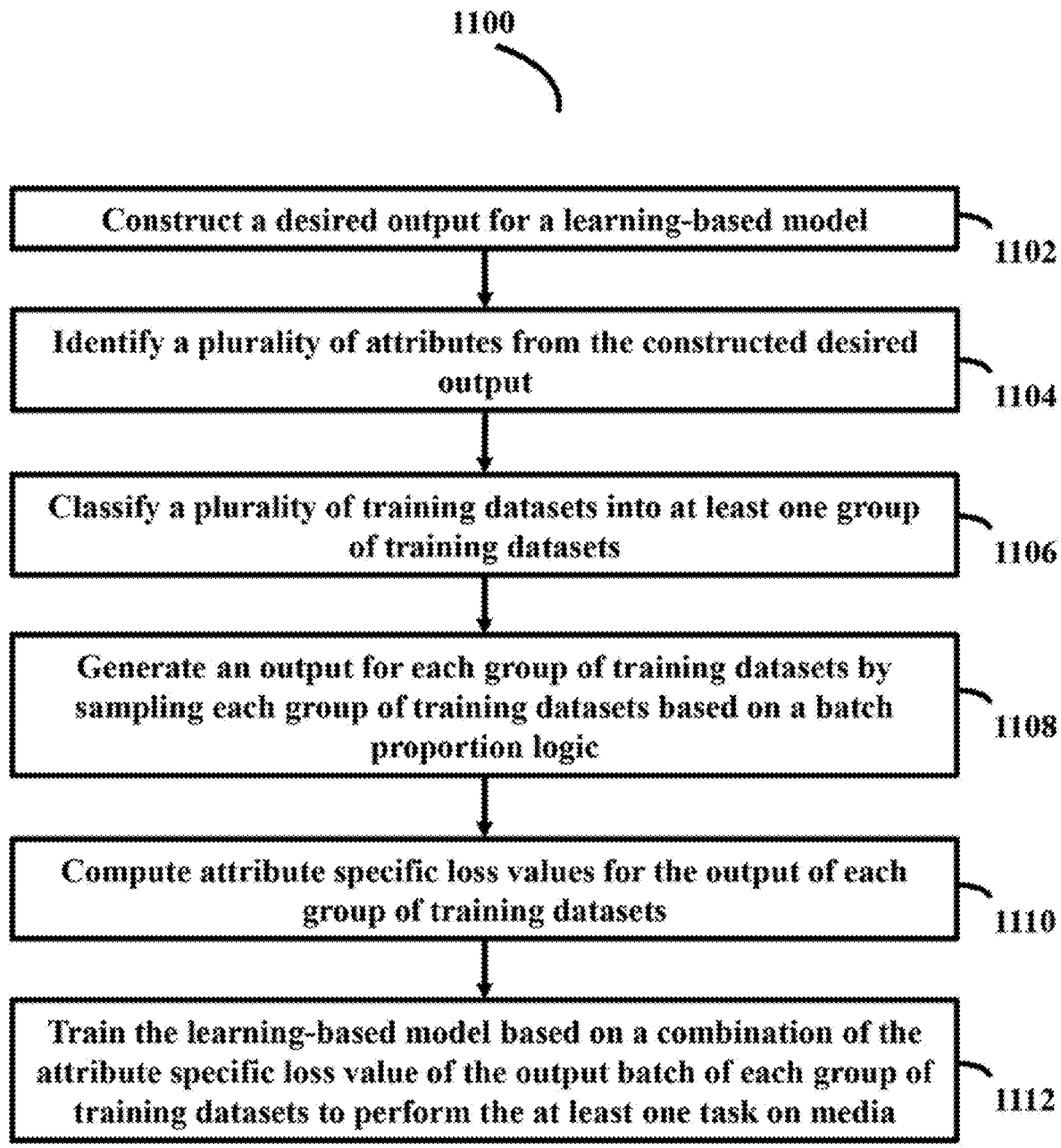
FIG. 11 is a flow diagram depicting a method for training the learning-based model to perform the one or more tasks on the media, according to exemplary embodiments as disclosed herein.

FIG. 11 is a flow diagram depicting a method 1100 for training the learning-based model 210a to perform the one or more tasks on the media, according to embodiments as disclosed herein.

At step 1102, the method includes constructing, by the electronic device 200, the desired output for the learning-based model 210a. At step 1104, the method includes identifying, by the electronic device 200, the plurality of attributes from the constructed desired output.

At step 1106, the method includes classifying, by the electronic device 200, the plurality of training datasets into the at least one group of training datasets, wherein each group of training datasets corresponds to at least one of the identified plurality of desired attributes. At step 1108, the method includes generating, by the electronic device 200, the output batch for each group of training datasets by processing each group of training datasets based on the batch proportion logic. At step 1110, the method includes computing, by the electronic device 200, the attribute specific loss values for the output of each group of training datasets. At step 1112, the method includes training, by the electronic device 200, the learning-based model 210a based on a combination of the attribute specific loss values of the output of each group of training datasets to perform the one or more tasks on the media. The various actions in the method 1100 may be performed in the order presented, in a different order or simultaneously. Further, in some embodiments, some actions listed in FIG. 11 may be omitted.

The embodiments disclosed herein can be implemented through at least one software program running on at least one hardware device and performing network management functions to control the elements. The elements shown in FIGS. 2 and 3, can be at least one of a hardware device, or a combination of hardware device and software module.

The embodiments disclosed herein describe methods and systems for performing tasks on media using attribute specific joint learning. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, embodiments may be implemented on different hardware devices, e.g. using one CPU or a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. An electronic device comprising:
   a memory; and
   a processor coupled to the memory and configured to:
   group a plurality of training datasets into a plurality of groups of training datasets based on a plurality of attributes,
   obtain a plurality of output batches for the plurality of groups of training datasets by sampling each group of training datasets based on a batch proportion of the plurality of groups of training datasets,
   obtain a plurality of loss values of the plurality of groups of training datasets respectively, and
   train a learning-based model based on the plurality of loss values.

2. The electronic device of claim 1, wherein the plurality of attributes comprises at least one of a scene understanding, depth correctness or sharp edges and gaps, and
   wherein the processor is further configured to train the learning-based model based on the plurality of loss values to perform a depth estimation.

3. The electronic device of claim 2, wherein the plurality of groups of training datasets comprises at least one of:
   an unlabelled media sequence dataset corresponding to an attribute of the scene understanding,
   a real-world sparsely labelled dataset corresponding to the attribute of the depth correctness, or
   a synthetic media with depth ground-truth dataset corresponding to the attribute of the sharp edges and gaps.

4. The electronic device of claim 3, wherein the processor is further configured to:
   obtain the plurality of loss values of the plurality of groups of training datasets respectively by:
   defining a view construction loss for one or more group of the plurality of groups of training datasets corresponding to the attribute of the scene understanding,
   defining a pixelwise $L_1/L_2$ loss for one or more group of the plurality of groups of training datasets corresponding to the attribute of the depth correctness and
   defining a gradient difference loss for one or more group of the plurality of groups of training datasets corresponding to the attribute of the sharp edges and gaps.

5. The electronic device of claim 2, wherein the processor is further configured to:
   receive an image,
   obtain the depth estimation by inputting the image to the trained learning-based model, and
   perform, based on the depth estimation and with respect to the image, at least one of: applying bokeh effect, applying augmented reality (AR) effect, AR measurement, refocusing, or applying dolly effect.

6. The electronic device of claim 1, wherein the processor is further configured to:
   adjust the batch proportion of the plurality of groups of training datasets based on the plurality of loss values,
   obtain a second plurality of output batches for the plurality of groups of training datasets by sampling each group of the plurality of groups of training datasets based on the adjusted batch proportion of the plurality of groups of training datasets or relative importance of the plurality of groups of training datasets,
   obtain a second plurality of loss values of the plurality of groups of training datasets respectively, and
   retrain the learning-based model based on the second plurality of loss values.

7. The electronic device of claim 6, wherein the processor is further configured to obtain the second plurality of output batches using, based on a training loss curve obtained for the plurality of loss values, the adjusted batch proportion of the plurality of groups of training datasets or the relative importance of the plurality of groups of training datasets.

8. The electronic device of claim 1, wherein the processor is further configured to tag each group of the plurality of groups of training datasets as one of a primary dataset or a secondary dataset.

9. The electronic device of claim 8, wherein the processor is further configured to align a second data distribution of each output batch of each group of the plurality of groups of training datasets corresponding to the secondary dataset to a first data distribution of the output batch of one or more group of the plurality of groups of training datasets corresponding to the primary dataset.

10. The electronic device of claim 1,
    wherein the processor is further configured to:
    obtain a combined loss value by weighting the plurality of loss values based on loss factors dynamically obtained based on the plurality of output batches or relative importance of the plurality of groups of training datasets, and
    train the learning-based model based on the combined loss value.

11. A control method of an electronic device comprising:
    grouping a plurality of training datasets into a plurality of groups of training datasets based on a plurality of attributes;
    obtaining a plurality of output batches for the plurality of groups of training datasets by sampling each group of the plurality of groups of training datasets based on a batch proportion of the plurality of groups of training datasets;
    obtaining a plurality of loss values of the plurality of groups of training datasets respectively; and
    training a learning-based model based on the plurality of loss values.

12. The control method of claim 11, wherein the plurality of attributes comprises at least one of a scene understanding, depth correctness or sharp edges and gaps, and
    wherein the training comprises training the learning-based model based on the plurality of loss values to perform a depth estimation.

13. The control method of claim 12, wherein the plurality of groups of training datasets comprises at least one of:
    an unlabelled media sequence dataset corresponding to an attribute of the scene understanding,
    a real-world sparsely labelled dataset corresponding to the attribute of the depth correctness, or
    a synthetic media with depth ground-truth dataset corresponding to the attribute of the sharp edges and gaps.

14. The control method of claim 13, wherein the obtaining the plurality of loss values comprises obtaining the plurality of loss values of the plurality of groups of training datasets respectively by:
- defining a view construction loss for one or more group of the plurality of groups of training datasets corresponding to the attribute of the scene understanding,
- defining a pixelwise $L_1/L_2$ loss for one or more group of the plurality of groups of training datasets corresponding to the attribute of the depth correctness and
- defining a gradient difference loss for one or more group of the plurality of groups of training datasets corresponding to the attribute of the sharp edges and gaps.

15. The control method of claim 12, further comprising: receiving an image,
- obtaining the depth estimation by inputting the image to the trained learning-based model, and
- performing, based on the depth estimation and with respect to the image, at least one of: an application of a bokeh effect, an application of an augmented reality (AR) effect, an AR measurement, a refocusing or an application of a dolly effect.

16. The control method of claim 11, further comprising:
- adjusting the batch proportion of the plurality of groups of training datasets based on the plurality of loss values;
- obtaining a second plurality of output batches for the plurality of groups of training datasets by sampling each group of the plurality of groups of training datasets based on the adjusted batch proportion of the plurality of groups of training datasets or relative importance of the plurality of groups of training datasets;
- obtaining a second plurality of loss values of the plurality of groups of training datasets respectively; and
- retraining the learning-based model based on the second plurality of loss values.

17. The control method of claim 16, wherein the obtaining the second plurality of output batches comprises obtaining the second plurality of output batches using, based on a training loss curve obtained for the plurality of loss values, the adjusted batch proportion of the plurality of groups of training datasets or the relative importance of the plurality of groups of training datasets.

18. The control method of claim 11, further comprising tagging each group of the plurality of groups of training datasets as one of a primary dataset and a secondary dataset.

19. A non-transitory computer-readable medium storing instructions, wherein the instructions are configured to cause a processor to:
- group a plurality of training datasets into a plurality of groups of training datasets based on a plurality of attributes;
- obtain a plurality of output batches for the plurality of groups of training datasets by sampling each group of the plurality of groups of training datasets based on a batch proportion of the plurality of groups of training datasets;
- obtain a plurality of loss values of the plurality of groups of training datasets respectively; and
- train a learning-based model based on the plurality of loss values.

20. The electronic device of claim 1, wherein the processor is further configured to obtain the plurality of loss values of the plurality of groups of training datasets respectively by applying an attribute specific loss function of the each of the plurality of groups of training datasets on each of the plurality of output batches.

* * * * *